United States Patent [19]
Kajimoto

[11] Patent Number: 5,974,220
[45] Date of Patent: Oct. 26, 1999

[54] VIDEO EDITING METHOD, NON-LINEAR VIDEO EDITING APPARATUS, AND VIDEO EDITING PROGRAM STORAGE MEDIUM

[75] Inventor: Kazuo Kajimoto, Neyagawashi, Japan

[73] Assignee: Matsushita Electric Industrial Co., Ltd., Japan

[21] Appl. No.: 08/982,382

[22] Filed: Dec. 2, 1997

[30] Foreign Application Priority Data

Dec. 4, 1996 [JP] Japan ................................. 8-324338

[51] Int. Cl.⁶ .................................................. H04N 5/781
[52] U.S. Cl. ........................... 386/52; 386/125; 386/46
[58] Field of Search ............................. 386/1, 4, 45, 46, 386/52, 64, 125, 126; 360/15; 369/83, 47, 48, 54, 59; H04N 5/781, 5/76, 5/92, 9/79

[56] References Cited

U.S. PATENT DOCUMENTS

| | | | |
|---|---|---|---|
| 5,107,481 | 4/1992 | Miki et al. | 369/59 |
| 5,398,142 | 3/1995 | Davy | 360/48 |
| 5,539,527 | 7/1996 | Kajimoto et al. | 358/335 |
| 5,687,160 | 11/1997 | Aotake et al. | 386/126 |
| 5,771,334 | 6/1998 | Yamauchi et al. | 386/126 |
| 5,787,224 | 7/1998 | Itoh et al. | 386/126 |
| 5,835,669 | 11/1998 | Hirayama et al. | 386/125 |
| 5,881,203 | 3/1999 | Fujinami et al. | 386/125 |

FOREIGN PATENT DOCUMENTS

| | | |
|---|---|---|
| 0 584 834 A2 | 3/1994 | European Pat. Off. . |
| 0 593 032 A2 | 4/1994 | European Pat. Off. . |
| 0 615 244 A2 | 9/1994 | European Pat. Off. . |
| 0 681 292 A2 | 11/1995 | European Pat. Off. . |

*Primary Examiner*—Thai Tran
*Attorney, Agent, or Firm*—Parkhurst & Wendel, L.L.P.

[57] ABSTRACT

A method of editing video in which video stored in a random access storage, medium is divided into small sections and the small sections are arranged for performing editing video, comprises the steps of: managing a series of storage areas of the storage medium in which video data is continuously stored as unit recorded areas; managing a series of available storage areas of the storage medium as unit free areas; storing video data continuously in one or plural unit free areas of the storage medium; copying video data of a prescribed amount before and after each gap with the video data stored in scattered unit free areas when the video data is stored in plural unit free areas; and regenerating the copied gap data as the video data of the prescribed amount before and after the gap when video data stored in plural unit recorded areas is regenerated for regenerating the video data stored in the storage medium in accordance with a playback instruction.

4 Claims, 23 Drawing Sheets

FIG. 7

PARENT SCREEN 701

| CUT | AFTER EDITING | | ID | POSITION IN HD | |
|---|---|---|---|---|---|
| | PLAYBACK START FRAME | PLAYBACK END FRAME | | PLAYBACK START FRAME | PLAYBACK END FRAME |
| 1 | 1 | 10 | 1 | 51 | 60 |
| 2 | 11 | 20 | 1 | 1 | 10 |
| 3 | 21 | 30 | 3 | 81 | 90 |
| 4 | 31 | 40 | 4 | 16 | 25 |

CHILD SCREEN 702

| CUT | AFTER EDITING | | ID | POSITION IN HD | |
|---|---|---|---|---|---|
| | PLAYBACK START FRAME | PLAYBACK END FRAME | | PLAYBACK START FRAME | PLAYBACK END FRAME |
| 1 | 1 | 10 | 2 | 31 | 40 |
| 2 | 11 | 20 | 3 | 1 | 10 |
| 3 | 21 | 30 | 2 | 11 | 20 |
| 4 | 31 | 40 | 4 | 66 | 75 |

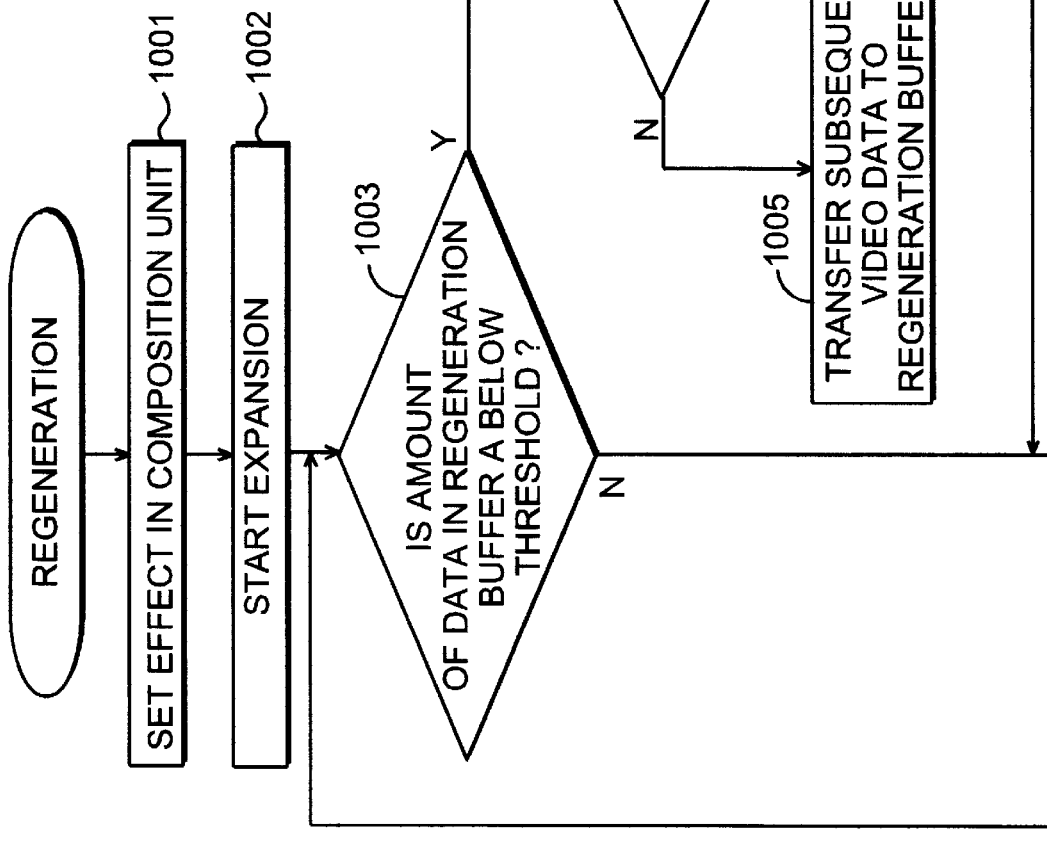

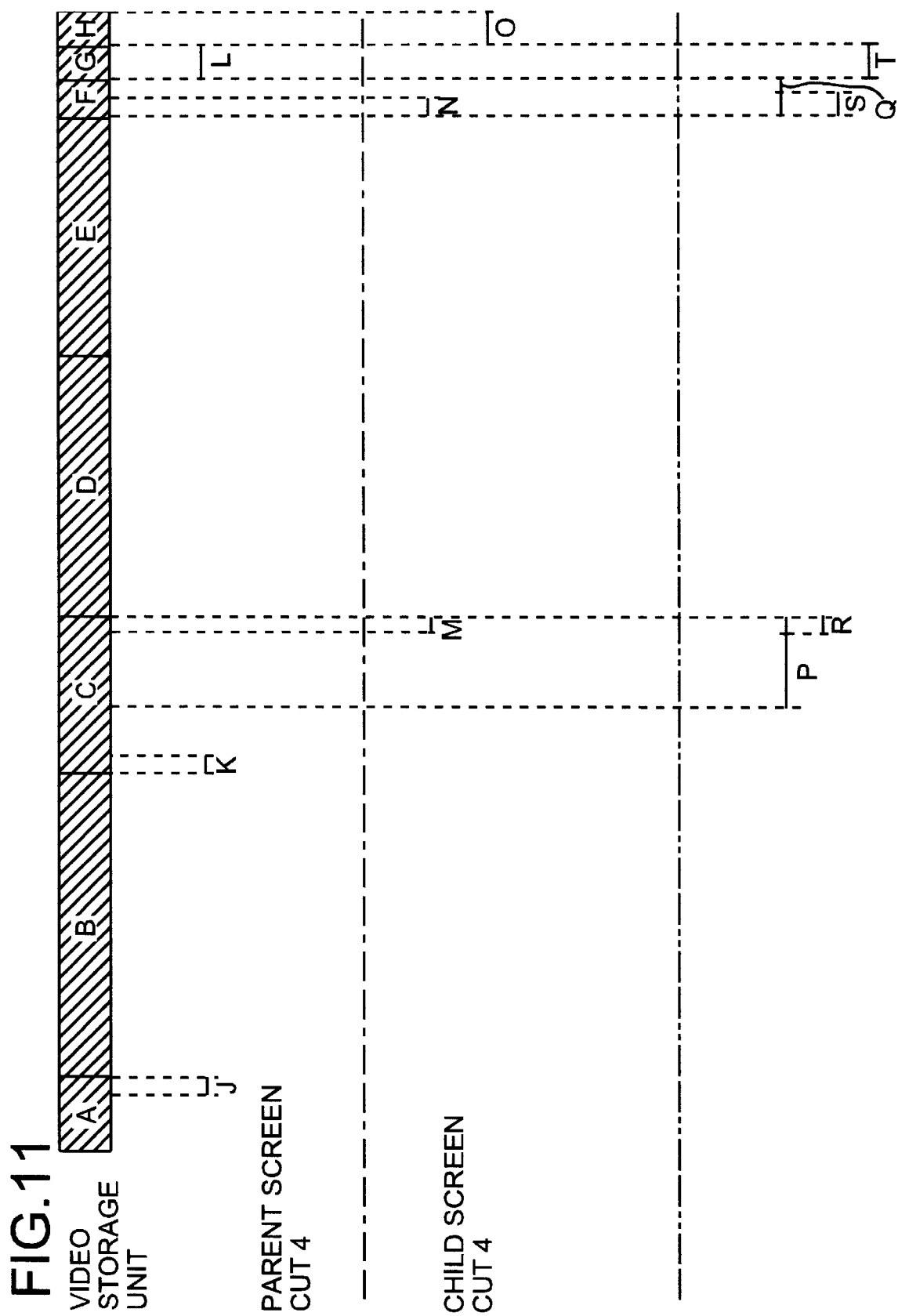

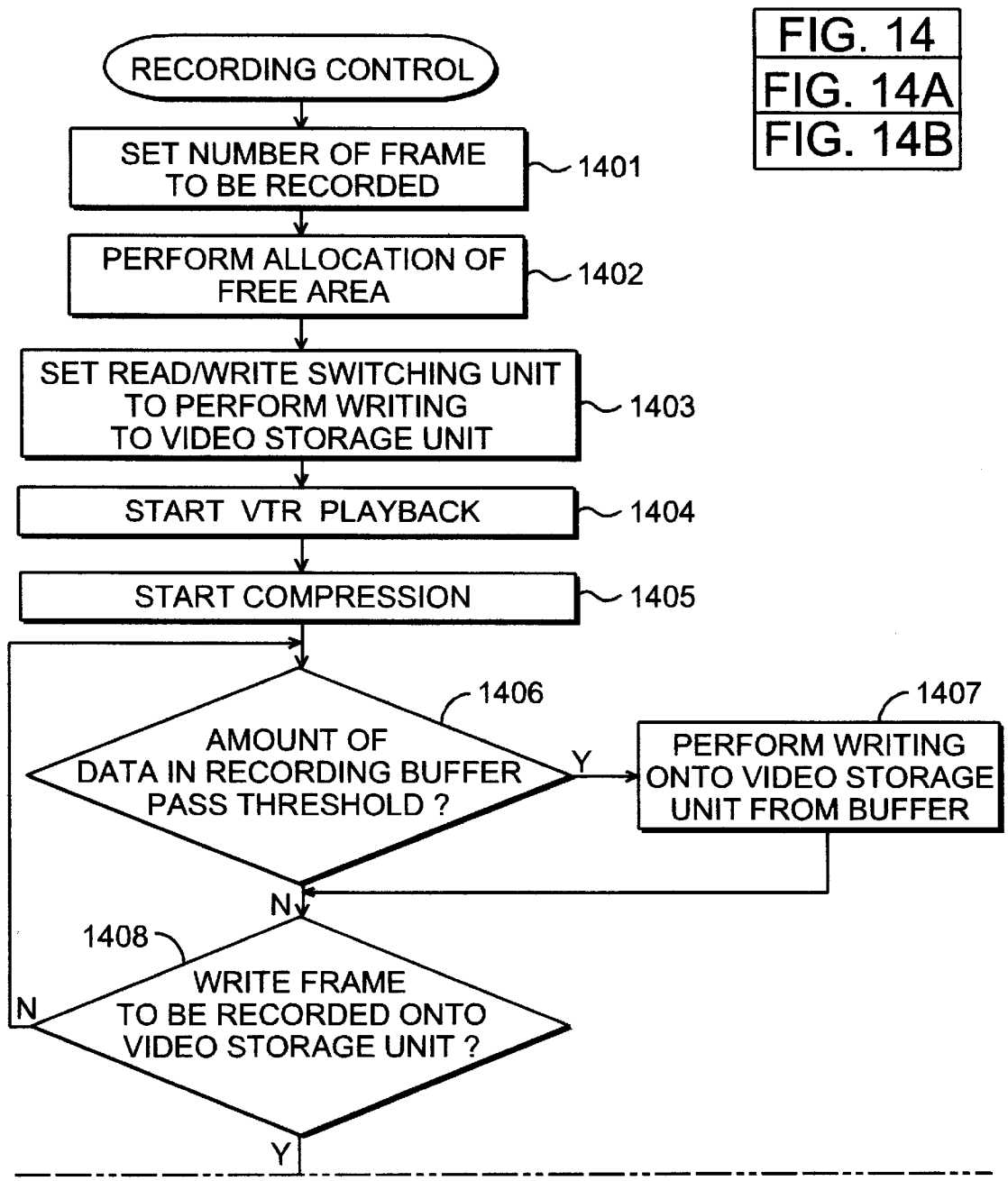

FIG. 16 PRIOR ART

PARENT SCREEN 1601

| CUT | AFTER EDITING | | ID | POSITION IN HD | |
|---|---|---|---|---|---|
| | PLAYBACK START FRAME | PLAYBACK END FRAME | | PLAYBACK START FRAME | PLAYBACK END FRAME |
| 1 | 1 | 10 | 1 | 51 | 60 |
| 2 | 11 | 20 | 1 | 1 | 10 |
| 3 | 21 | 30 | 3 | 81 | 90 |

CHILD SCREEN 1602

| CUT | AFTER EDITING | | ID | POSITION IN HD | |
|---|---|---|---|---|---|
| | PLAYBACK START FRAME | PLAYBACK END FRAME | | PLAYBACK START FRAME | PLAYBACK END FRAME |
| 1 | 1 | 10 | 2 | 31 | 40 |
| 2 | 11 | 20 | 3 | 1 | 10 |
| 3 | 21 | 30 | 2 | 11 | 20 |

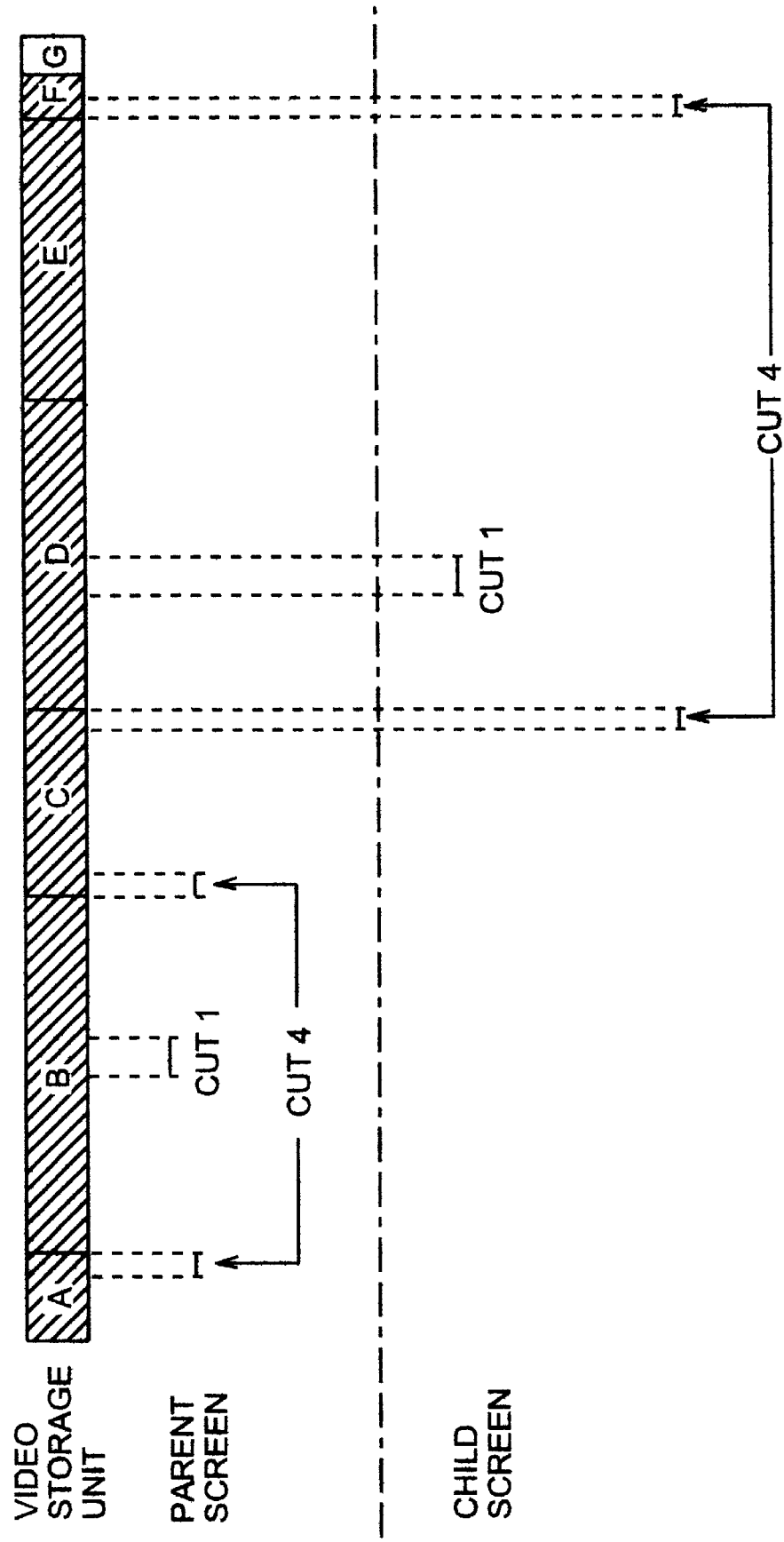

VIDEO EDITING METHOD, NON-LINEAR VIDEO EDITING APPARATUS, AND VIDEO EDITING PROGRAM STORAGE MEDIUM

FIELD OF THE INVENTION

The present invention relates to a video editing method, a non-linear video editing apparatus, and a video editing program storage medium, and more particularly to a non-linear video editing apparatus which divides video stored in a random accessible storage medium into small sections and arranges he small sections, to perform editing of video, a video editing method using the non-linear video editing apparatus, and a video editing program storage medium for storing a video editing program which performs the video editing method.

BACKGROUND OF THE INVENTION

A non-linear video editing apparatus is used for storing video in a random access medium such as a hard disc or the like and performing editing with ease utilizing its random accessibility.

In general, editing of video is performed by dividing video into small continuous segments termed "cuts", and rearranging the cuts as intended by an editor. In a case in which plural cuts are edited and playback of the edited cuts is checked in a tape medium such as a video tape, dubbing of the tape is performed in a way that respective cuts are arranged continuously in a desired order, and playback thereof is performed.

Meanwhile, in another case in which video is stored in a random access storage medium such as a hard disc, if cuts are spaced apart from each other therein, upon completion of read out of data of a previous cut, the head of the subsequent cut can be accessed. Therefore, it is possible to perform playback of cuts as if they were stored continuously with no necessity of copying data unlike in the case of dubbing the tape. The editor defines small segments of continuously stored rain a hard disc or the like as a cut, and directs a storage location on the storage medium to specify a cut.

In case of read-out of data from a hard disc or the like, it should be noted that data is preread from a semiconductor memory or the like which has a higher speed readout/write capability than a hard disk and the memory is used as a buffer, through which read-out of data is performed, thereby discontinuity of playback of video and audio caused by delay in access time is avoided, since high speed random access requires a little time. Meanwhile, in case of picture recording, data is stored in-the buffer and then written onto a hard disk or the like, repeatedly, thereby video data is stored on a hard disc with no influence of delay in access time.

In many cases, composition of video of 2 systems (channels) is utilized to perform editing of video, as represented by "picture-in-picture" in which one video is reduced and placed on a background video. FIG. 6 illustrates a screen according to the picture-in-picture, which is used for displaying a small news video as a child screen 602 at the back of a newscaster as a parent screen 601.

As an example of a non-linear editing apparatus in which video of 2 channels can be regenerated and composited simultaneously, U.S. Pat. No. 5,539,527 (hereinafter referred to as a prior art example) will now be described.

FIG. 12 is a block diagram showing a construction of 2 channel simultaneous-playback non-linear video editing apparatus according to the prior art. As shown in the Figure, the non-linear video editing apparatus comprises a video storage unit 1201, a free area management information storage unit 1202, a recorded area management information storage unit 1203, a recording/playback switching input unit 1204, a recording control means 1205, a read/write switching unit 1206, a VTR 1207, a video input unit 1208, a compression unit 1209, a recording buffer 1210, a composition unit 1211, a video output unit 1212, a monitor 1213, an editing information input unit 1214, an editing information storage unit 1215, a regeneration control unit 1216, a playback channel (CH) switching unit 1217, regeneration buffers A1218 and B1219, expansion units 1220 and 1221.

In the same Figure, the video storage unit 1201 is used for storing video data and a hard disc or the like serves as the unit. The free area management information storage unit 1202 is used for storing free area management information for managing available free area of the storage area of the video storage unit 1201. The recorded area management information storage unit 1203 is used for storing recorded area management information for managing areas in use. The recording/playback switching input unit 1204 is used for inputting an instruction for switching recording/playback from the user to the apparatus. The recording control unit 1205 is used for controlling picture recording in the video storage unit 1201, that is, storage of data. The read/write switching unit 1206 is used for switching read/write for data input/output operations of the video storage unit 1201.

The VTR 1207 is used for performing playback of video to be stored in the video storage unit 1201 from a video tape. The video input unit 1208 is used for converting playback video in the VTR into digital video data and inputting the digital video data to the editing apparatus. The compression unit 1209 is used for compressing the video data. As the picture recording buffer 1210, a memory or the like, namely, a medium which has a high-speed write/read capability than the video storage unit 1201, is used for temporarily storing video data in storing the video data in the video storage unit 1201.

The composition unit 1211 is used for compositing playback video of plural channels. The video output unit 1212 is used for converting digital data of the composite video that has been composited by the composite unit 1211 into analog video data and outputting the analog video data into the monitor 1213. The editing information input unit 1214 is used for inputting an instruction by the user for editing video data stored in the video storage unit 1201 as editing information. The editing information storage unit 1215 is used for storing editing information input from the editing information input unit 1214.

The regeneration control unit 1216 is used for controlling regeneration of video data stored in the video storage unit 1201. The playback channel switching unit 1217 is used for switching play back channels. As the regeneration buffers A1218 and B1219, a memory or the like, namely a medium which has a high-speed write/read capability than the video storage unit 1201 is used and the video data is temporarily stored therein at the regeneration of the video data stored in the video storage unit 1201 in channels 1 and 2. The expansion units of respective channels 1220 and 1221 are used for expansion of video data in tile respective regeneration buffers, in which the stored video data is decompressed into video data which can be playback-displayed.

In the prior art example, storage of video data in a hard disc, namely, recording is not described. However, in an example of U.S. Pat. No. 5,539,527, since video data is sequentially written onto a continuous area on a hard disc, to realize this storage state, assume that a recording system which ensures that sequentially handled video data as a cut to be allocated is stored in a continuous area on a hard disc is employed herein.

This recording method is implemented by storing data according to a file management method referred to as a consecutive file system which is used a lot to handle video data as a file.

Hereinafter, (1) recording 1 and (2) playback 1 will now be described as operations of recording and playback of the prior art non-linear video editing apparatus, respectively. Assume that video signals in NTSC is used and playback time of one frame (corresponding to one screen) is 33.3 msec for computation. The 33.3 msec is used as one frame time. For storage of video data in a storage unit of a non-linear editing apparatus, assume that video data is compressed for each frame using a technique such as a JPEG (Joint Photographic Experts Group) and the compressed video data is 44 Kbytes long per frame.

Video data of one frame (one screen) is handled as a minimum unit and video data of several frames or more is handled as one unit for data transfer. Herein, assume that 10 frames are set as amount of read/write frames. For allocation of cuts, assume that specification is performed for each amount of frames or optionally performed by the user for setting the specification for each amount of frames in the apparatus.

A hard disc is used as the random access video storage unit 1201 shown in FIG. 12. Assume that random accessibility of the hard disc, a data transfer rate thereof, and a size of a sector, i.e., access unit of a hard disc, are 20 msec, 3 Mbytes/sec, and 512 bytes, respectively. The accessibility is realized by a hard disc ST12550N in segate Corp. As described above, the video is compressed into one in 44 Kbytes for each frame and stored in the video storage unit 1201. Representing the video data of one frame by a sector (storage unit of a hard disc), the video data of one frame occupies a storage area of 88 sectors (one sector=½ Kbytes).

(1) RECORDING 1

Assume that video data has been stored in the Video storage unit 1201. Reference numeral 1301 in FIG. 13 indicates a storage area of the video storage unit 1201 linearly from left and colored portions indicate ranges in which the video data has been stored. In the Figure, B and D respectively indicate areas in which a series of video data is stored and A, C and E respectively indicate a series of available free areas.

Information on an available area of the storage area of the video storage unit 1201 in FIG. 12 and information on an area in which video data is stored are stored as the free area management information and the recorded area management information, respectively. The free area management information and the recorded area management information are stored in the free area management information storage unit 1202 and the recorded area management information storage unit 1203, respectively.

Reference numerals 1302 and 1303 in FIG. 13 illustrate the free area management information and the recorded area management information, respectively. The free area management information 1302 is for a series of free areas and includes a free area ID, a free area pointer, and a number of free frames as shown in the Figure. The free area ID indicates information for specifying a series of free areas. The free area pointer includes information of a start sector and an end sector in a hard disc storage space 1301. The number of free frames indicates information on the number of frames in which video data can be recorded. Similarly, the recorded area management information 1303 includes a recorded area ID for specifying respective recorded areas in which a series of video data is recorded, a recorded area pointer consisting of information of a start sector and an end sector in the hard disc storage space 1301, and the number of recorded frames indicating the number of frames in which video data is recorded, as information for each recorded area. As shown by reference numerals 1302 and 1303, the area pointer is represented by A, B. . . , for simplicity. From the free area pointer and the recorded area pointer included in these management information, respective area sizes can be computed and from the computed area size and amount of data per frame, the number of video frames corresponding to each area can be computed. Therefore, hereinafter size or position of data in a hard disc is represented by a frame unit with no use of a sector.

Editing with no dubbing mentioned above becomes possible by storing video stored in a tape medium such as a widely-spread and cheap video tape as video data in the video storage unit of the non-linear editing apparatus.

An operation of recording video in the non-linear video editing apparatus.

When the user provides an instruction for recording using the recording/playback switching input unit 1204, the recording control unit 1205 starts recording control. FIG. 14 is a flowchart showing recording under control of the recording control unit 1205.

In step 1401 in FIG. 14, length of video to be recorded is set as a video frame. Assume that video to be recorded is 100 frames long.

In step 1402, free areas on the video storage unit 1201 are allocated. In this case, assume that the free area management information 1302 shown by 1302 in FIG. 13 is referred to so that video to be recorded is sequentially stored, thereby free areas of a capacity more than the video data capacity are set to be allocated. As a free area of the number of frames or larger, ID=3 area E of the number of frames 140 is allocated.

In step 1403, the recording control unit 1205 sets the read/write switching unit 1206 to perform writing onto the video storage unit 1205 for storing video data. In step 1404, the recording control unit 1205 instructs the VTR 1207 to start playback and then in step 1405 instructs the compression unit 1209 to start compression. As a result, video signals output from the VTR 1207 are subjected to digital conversion in the video input unit 1208, and compressed into video signals of 44 Kbytes per frame by the compression unit 1209. The compressed video data is temporarily stored in the recording buffer 1210.

In step 1406, it is checked whether the number of frames of video data stored in the recording buffer 1210 has exceeded a threshold or not, of the allocated free area E for each 10 frames. Assume that the threshold of the recording buffer is 10 frames as amount of write frames.

When 10 frames are exceeded, in step 1407, writing is performed onto the video storage unit 1201 from the recording buffer 1210 for each amount of write frames. In this case, writing is performed onto the video storage unit 1201 starting with a head Since time required for writing video data onto 10 frames is 20 msec+44×10/3000 sec=166.7 msec=5 frame time, writing is completed by the time next 10 frames are stored in the recording buffer 1210. Therefore, recording for each 10 frames allows writing video data onto the video storage unit 1201 with no discontinuity.

Subsequently to step 1407, step 1408 is performed. When amount of data is small and does not reach a threshold in step

1406, writing in step 1407 is not performed and decision in step 1408 is performed.

In either case, in step 1408, it is checked whether the recorded frames of the number set in step 1410 have been written onto the video storage unit 1201 or not and when it is decided that writing is not performed, that is, recording is not completed, operation is returned to step 1406, and steps 1406 to 1408 are repeated until recording is completed, whereby writing onto the video storage unit 1201 from the recording buffer 1210 is performed.

In step 1408, when it is decided that "writing is performed", that is, recording in the video storage unit 1201 is completed, in step 1409, an initially allocated free area E is divided into a recorded area and a free area. In this case, since 100 frames of 140 frames (ID=3 free area E) are recorded, the free area E is divided into 100 recorded frames and 40 free frames. In step 1401, the recording control unit 1205 allocates a uniquely identified number to a recorded area to update recorded area management information. In this example, as shown in FIG. 15, ID=3 is allocated to the recorded area E of 100 frames to update the recorded area management information 1502.

In stop 1414, the recording control unit 1205 checks a size of remaining free areas and decides whether it is 0 or not. When it decides that the size is 0, the recording control unit 1205 deletes it from the free area management information storage unit in step 1412, or otherwise, in step 1413, it updates the free area management information 1503.

In this case, since the remaining free area F is 40 frames, step 1413 is performed and updating is performed so that ID=3 free area indicates the remaining 90 frames as shown in FIG. 15, whereby procedure of recording control is completed.

FIG. 15 is a diagram showing the video storage unit 1501, the recorded area management information 1502, and the free area management information 1503 after recording. The free area E of the video storage unit 1301 in FIG. 13 is divided into the recorded area E and the free area F of the video storage unit 1501 in FIG. 15.

(2) PLAYBACK 1

A description is given of a case in which video recorded in (1) is edited by the user for playback. Picture-in-picture screen is implemented by the composite unit 1211 in the editing apparatus with playback capability of 2 channel system as shown in FIG. 6. As mentioned above, large video and small video in picture-in-picture are called the parent and child screens 601 and 602, respectively.

To realize this, 2 channel simultaneous playback in which simultaneous playback of the video for the parent screen and the video for the child screen is performed and resulting playback video of 2 channels is composited by the composition unit 1211. The video through the composition unit 1211 is input from the video output unit 1212 to the monitor 1213, on which the user see the composite image.

For such playback, the user preinputs editing information with the editing information input unit 1214. The input editing information is held in the editing information storage unit 1215 and referred to in playback. FIG. 16 is a conceptual diagram showing the editing information. In the Figure, reference numerals 1601 and 1602 denote editing information of the parent screen 601 and the child screen 602, respectively. As mentioned above, since editing is performed by allocation and rearrangement of cuts comprising a series of video data, editing information is represented by For such playback, the user preinputs editing information with the editing information input unit 1214. The input editing information is held in the editing information storage unit 1215 and referred to in playback. FIG. 16 is a conceptual diagram showing the editing information. In the Figure, reference numerals 1601 and 1602 denote editing information of the parent screen 601 and the child screen 602, respectively. As mentioned above, since editing is performed by allocation and rearrangement of cuts comprising a series of video data, editing information is represented by arrangement of cuts. For example, in the editing information 1601, 1 to 10 frames, 11 to 20 frames, and 21 to 30 frames are CUT1, CUT2, and CUT3, respectively. The editing information also indicates information on the location of the continuous recorded area in which video data of respective cuts is stored, or information on what portion in the continuous recorded area the cut corresponds to.

For example, in the CUT1 of the parent screen, video data thereof belongs to a recorded area 1 and stored in 51st to 60th frames thereof in HD, playback of which is performed in 1st to 10th frames in playback time.

As described above, in specifying cuts for editing, specification is performed for each 10 frames as amount of read frames, or the specification is performed in one frame unit by the user so that the apparatus performs setting for each 10 frames, thereby editing information of specifying the cut for each 10 frames is obtained.

After editing information is recorded according to the user's instruction, when the recording/playback switching unit 1204 issues an instruction for playback, the regeneration control unit 1216 starts regeneration control.

FIG. 17 is a flowchart of a regeneration processing under control of the regeneration control unit 1216. The regeneration processing includes regeneration preparation in step 1701 in which video data is written onto the regeneration buffer and regeneration itself in step 1702 in which the regeneration buffer is supplied with video data during regeneration. For implementing picture-in-picture in 2 channel system, assume that playback of the parent screen and playback of the child screen are performed in CHANNEL 1 and CHANNEL 2, respectively. That is, playback of the parent screen and playback of the child screen are performed using the regeneration buffers A1218 and A1219, respectively.

FIG. 18 is a flowchart showing the regeneration preparation in detail. In step 1801, the write/read switching unit 1206 is set to perform readout from the video storage unit 1201 for reading video data from the video storage unit 1201.

In step 1802, the playback CH switching unit 1217 performs switching to the regeneration buffer A1218. In step 1803, data is transferred from the video storage unit 1201 until the regeneration buffer A1218 is filled. Assuming that filling 10 frames or more indicates completion, in this case, filling is completed at the completion of video data transfer of the CUT 1 specified by the editing information unit 1601 to the regeneration buffer A1218.

In step 1804, the playback CH switching unit 1217 performers switching to the regeneration buffer B1219. In step 1805, data is transferred from the video storage unit 1201 until the regeneration buffer B1219 is filled. Also in this case, filling is completed at the completion of video data transfer of the CUT 1 specified by the editing information unit 1602 to the regeneration buffer B1219.

Then, the regeneration step 1702 in FIG. 17 is performed. FIG. 19 is a flowchart showing the regeneration in detail.

In step 1901, effects are set in the composition unit 1211. In this case, playback screen composition is set therein to make the parent screen and the child screen picture-in-picture. In step 1902, the expansion unit 1220 for the regeneration buffer A1218 and the expansion unit 1221 for the regeneration buffer B1219 are respectively instructed to start expansion. In accordance with the instruction, compressed video is input from each regeneration buffer frame by frame and expanded, resulting in original video data, which is input to the composition unit 1211, to make composite video data therein.

When expansion starts, data in the regeneration buffer is consumed. Therefore, unless data is transferred from the video storage unit 1201 before the regeneration buffer is empty, discontinuity of playback of video occurs.

In step 1903, it is checked whether amount of data in the regeneration buffer A1210 is below a threshold or not, and when it is below the threshold, in step 1904, the buffer is replenished with subsequent video data. In this case, since 10frames are assumed to be a threshold, immediately after the start of regeneration, step 1904 is performed. Assume that amount of replenishment data is 10 frames.

In step 1904, data of CUT 2 of the parent screen of 10 frames is transferred.

Time required for this transfer is 20 msec+44×10/3000 sec=166.7 mse=5 frame time.

Thus, since 5 frame time is required for transfer, at the completion of transfer, 5 frames of 10 frames are consumed and the other 5 frames remain, to which 10 frames are added by transfer, resulting in amount of data of 15 frames is present in the regeneration buffer A1218.

After the processing, in step 1905, amount of data in the regeneration buffer B1219 is checked and when the amount is below the threshold as in the step 1903, subsequent data is transferred in step 1906. This transfer also requires 5 frame time, and since transfer to the regeneration buffer B1219 requires time for transfer to the regeneration buffer A by the time transfer thereto starts, time required for completion of transfer after the amount is below the threshold is time required for transfer to the regeneration buffer A+time required for transfer to the regeneration buffer B=5 frame time+5 frame time=10 frame time.

Since 10 frame time is required for transfer in total, at the transfer of video data of 10th frame in the regeneration buffer B1219 to the expansion unit 1221, video data of 10 frames is added thereto. Therefore, at the completion of transfer, 10 frames are present in the regeneration buffer B1219.

During this 5 frame time required for video data transfer to the regeneration buffer B1219, since video data is consumed at the same pace from the regeneration buffer A1218, video data of 5 frames of 15 frames is consumed, resulting in remaining 10 frames. At the completion of transfer to the regeneration buffer B1219, data of 10 frames remains in each of the regeneration buffers A1218 and B1219.

Thus, at the completion of consumption from the buffers and replenishment therein, 10 frames remain in respective buffers, which indicates the initial filling state. Therefore, thereafter, no discontinuity of data occurs by the repetition.

As described above, processings in steps 1903 to 1906 are repeated until it is decided that data is fully regenerated in step 1907, thereby playback is performed according to editing information set by the user.

As should be appreciated from the foregoing description, in the prior art non-linear video editing apparatus, in case of recording, that is, storing video in a storage device of the editing apparatus as video data, the apparatus is set to store the video data in continuous free area, thereby recording and playback of 2 channel system can be performed with no discontinuity.

In the prior art non-linear editing apparatus, assume that video of 90 frames is recorded after creating ID=3 recorded area. In the free area management information 1502 in FIG. 15, irrespective of free 110 frames in total (20 frames in free area 1, 50 frames in 2, and 40 frames in 3), there are no continuous free 90 frames. Consequently, recording is impossible in the prior art setting.

As a solution to this, the followings are possible.
A) Unnecessary video data is deleted to increase free areas.
B) To collect free areas, data in the recorded area in a hard disc is sequentially gathered to create a large free area at the end thereof (garbage collection).
c) A scattered file system is employed for management of data.

In A), since an area in which data to be deleted is stored is not always before and after another fee area, increase in free areas as a whole does not always result in increase in continuous free areas. High-volume deletion has a high possibility of increasing continuous free areas. However, when the need for the deleted data arises, storage of video data by recording must be performed again at much expense in time and effort. Therefore, it is undesirable to delete large volumes of data with ease or high frequency.

In B), it is possible to enlarge continuous free areas. However, since repetition of copying data in the disc for movement of data requires much time, during which editing or playback cannot be performed.

To avoid the problem, data management to which the scattered file system which allows handling data stored in scattered storage areas as a file is applied rather than a consecutive file system in which "serial data is always stored in a continuous storage area" is employed, which becomes a measure against c). As this system, for example, MSDOS in Micro soft CORP. is shown as a typical and general example of a disc operating system in which a file is divided into plural areas for storage.

In the prior art example, assume that the MSDOS is employed as a method of managing a file in the video data storage unit, to perform recording a series of video in plural scattered free areas.

To implement the construction described above, each ID includes plural free area pointers of the free area management information and plural recorded information pointers of the recorded area management information.

FIG. 21 illustrates free area management information 2102 and recorded area management information 2103 each corresponding to tho video storage unit 2101 after (1) recording 1. As shown in the third Figure, free areas are managed in one ID and the total number of free frames is 110.

An operation of (3) recording 2 and (4) playback 2 of the non-linear video editing apparatus constructed above will now be described.

(3)RECORDING 2

FIG. 20 is a flowchart showing recording processing. In step 2001, a length of video to be recorded is set. As described above, assume that video of 90 frames is recorded. In step 2002, allocation of an initial free area is performed, referring to the free area management information. In this case, allocation of free areas of 20 frames of A in the third Figure is performed.

Subsequent steps 2003 to 2008 are performed as in the steps 1403 to 1408 in FIG. 14 as described in the prior art example (1) recording 1.

In step 2009 subsequent to step 2008, it is decided whether the free area A is filled with video data during recording or not. When it is decided the free area A is filled with video data, in step 2010, allocation of the next free area is performed. At this time, allocation of free area C is performed.

Until it is decided in step 2009 that the allocated area C is filled with video data, steps subsequent to step 2006 are repeated and in step 2010, allocation of free area F is performed.

Until it is decided in step 2008 that recording is completed, steps subsequent to step 2006 are repeated, whereby 20 frames, 50 frames, and 20 frames of video of 90 frames are recorded in A, C, and F, respectively. When it is decided in step 2008 that writing onto the video storage unit 1201 is completed, in step 2011, the free area F is divided into recorded areas and free areas. At this time, free areas of 40 frames are divided into recorded areas of 20 frames and free areas of 20 frames.

In step 2012, recorded areas are recorded as recorded area management information. In step 2013, the recording control unit 1205 deletes free areas of size zero (free areas A and C) from the free area management information and updates free area management information in step 2014 for those of size non-zero (F).

In this case, since remaining free area G is 20 frames, updating is performed so that free area indicates the area of 20 frames in step 2014. As the updated state, the video storage unit 2201, the free area management information 2202, and the recorded area management information 2203 are shown in FIG. 22.

In this recording, recording for each 10 frames as write frames allows recording with no discontinuity as in FIG. 14. writing onto free areas from buffers for each write frames has been described herein. In this setting, unless amount of remaining free areas is not smaller than the amount of write frames, writing is impossible. Then, algorithm for decision on the remaining area size in step 2009 in FIG. 20 is changed into "Is the remaining areas less than 10 frames ?" and when it is less than 10 frames, in step 2010, allocation of next free areas is performed. In actuality, the remaining free areas and the write frames are set to meet specific conditions.

(3) PLAYBACK 2

A playback of editing information in FIG. 7 in the recording state of FIG. 22 is described.

The PLAYBACK 2 is performed following a flowchart in FIG. 19 as in (2) playback 1. In CUTs 1, 2, and 3 of the parent and child screens, playback is identical to that according to the editing information shown in FIG. 16. That is, at the completion of filling in the CUT 3 of the child screen, 10 frames remains in each of the regeneration buffers A1218 and B1219, which are consumed. In this stage, playback with no discontinuity is possible as in (2) PLAYBACK 1. As shown in FIG. 23, video data of the CUTs 1 of the parent and child screens is sequentially stored and the video data of read frames is sequentially transferred.

When the CUT 3 of the parent screen is transferred from the regeneration buffer A1218 to the expansion unit 1220, in step 1904 in FIG. 19, 10 frames of CUT4 are transferred from the video storage unit 1201 to the regeneration buffer A 1218. The CUT4 corresponds to 16th to 25th frames of ID=4 recorded area in editing information 701 in FIG. 7.

As shown in FIG. 23, in ID=4 recorded area, 16th to 20th frames are in an area A, and 21st to 25th frames are in an area C. In transfer of 10 frames of CUT 4, first 5 frames and next 5 frames are transferred from the area A and the area C, respectively.

Time required for transfer of the first 5 frames is, 20 msec+44×5/3000 msec=93.3 msec. Similarly, transfer of the next 5 frames requires 93.3 msec, adding tip to 186.7 msec. Since the total transfer time 186.7 msec indicates 6 frame time, when 6th frame is transferred from the regeneration buffer A1218 to the expansion unit 1220 and 4 frames remains, 10 frames are added thereto. After the transfer, video data of 14 frames is present therein.

Upon completion of transfer to the parent screen, in step 1906 in FIG. 19, CUT 4 of the child screen is transferred. The CUT 4 corresponds to 66th to 75th frames in the ID=4 recorded area.

Also in this case, as shown in FIG. 23, 66th to 70th frames, 71st to 75th frames are transferred from the area C and the area F, respectively. As in the case of the parent screen, since first 5 frames and next 5 frames are respectively transferred, the transfer requires 186.7 msec. In step 1905, until transfer starts after the amount of data is below the threshold, transfer to the regeneration buffer A1218 must be performed. As a result, the waiting time includes previous transfer time and completion of transfer to the regeneration buffer B1219 after the amount is below the threshold requires 373.3 msec in total, which indicates 12 frame time.

During this transfer, the regeneration buffer B 1219 is replenished with video data of 10 frames, during which video data of 1st to 12th frames is transferred to the expansion unit 1221, resulting in video data of 8 frames in the regeneration buffer B1219, which differs from original 10 frames.

Thus, in case of a cut including a boundary of the recorded area such as the CUT 4, since video data of read frames in the boundary cannot be read at a time and accordingly must be accessed twice or more, requiring a long time, the video data in the regeneration buffer does not return to original 10 frames at the completion of consumption and replenishment of video data, which reduces video data. As a result, discontinuity of playback video occurs because the buffer is not replenished with data at the sufficient pace.

To implement the "picture-in-picture" with no discontinuity of playback of 2 channel system in the non-linear editing apparatus which stores video data in the random access storage device, a series of video data is always stored in a continuous storage area during recording by managing a consecutive file system and so forth. However, in this case, discontinuous free areas of the storage unit are not utilized efffectively. In addition, deletion of data or garbage collection for utilizing the free areas causes the problem described above.

Use of the file management system for use in the disc operating system in the scattered file system allows effective use of the storage area. However, for playback of 2 channel system, storage of serial data in scattered areas causes delay, leading to discontinuity of playback.

SUMMARY OF THE INVENTION

Accordingly, it is an object of the present invention to provide a method of editing video in which a series of video data is stored in a discontinuous free area of a storage medium and used for video playback of 2 channels with no discontinuity in the non-linear editing apparatus.

It is another object of the present invention to provide a non-linear video editing apparatus which can record video in approximate total of scattered free areas without collecting free areas in the random access storage medium and can perform playback of video of 2 channels if editing is performed by specification of cuts in which video data is stored in scattered areas.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a method of editing video in which video stored in a random access storage medium is divided into small sections and the small sections are arranged for performing editing video comprises the steps of: managing a series of storage areas of the storage medium in which video data is continuously stored as unit recorded areas; managing a series of available storage areas of the storage medium as unit free areas; storing video data continuously in one or plural unit free areas of the storage medium; copying video data of a prescribed amount before and after each gap with the video data stored in scattered unit free areas into the unit free area when the video data is stored in plural unit free areas; and regenerating the copied gap data as the video data of the prescribed amount before and after the gap when video data stored in plural unit recorded areas is regenerated for regenerating the video data stored in the storage medium in accordance with a playback instruction. When the video data stored in plural unit free areas is regenerated, copied gap data is used as video data stored in scattered in unit recorded areas.

According to a second aspect of the present invention, a non-linear video editing apparatus which divides video stored in a random access storage medium into small sections and arranges the small sect ions to perform editing video comprises: a video storage unit with random access storage areas for storing video data; a recorded area management information storage unit for storing recorded area management information including information of a location and a capacity of each unit recorded area, and information of video data stored in the unit recorded area, on assumption that a series of storage areas in which video data is continuously stored of the video storage unit are unit recorded areas; a free area management information storage unit for storing free area management information including information of a location and a capacity of each unit free area on assumption that a series of available storage areas are unit free areas of the video storage unit; a recording control unit for storing video data in one or plural unit free areas of the storage unit; a gap data copy unit for copying video data of a prescribed amount before and after each gap in which the video data is stored in scattered unit free areas in the unit free area after recording under control of the recording control unit when the video data is stored in plural unit free areas; and a regeneration control unit for regenerating gap data as video data of a prescribed amount before and after the gap when video data stored in plural unit recorded areas is regenerated for regenerating video data stored in the video storage unit in accordance with a playback instruction. When the video data stored in plural unit free areas is regenerated, copied gap data is used as video data stored in scattered in unit recorded areas.

According to a third aspect of the present invention, in the non-linear editing apparatus of claim 2, the video data storage unit comprises a magnetic hard disc.

According to a fourth aspect of the present invention, a video editing program storage medium which stores a video editing program in which video stored in a random access video storage medium i s divided into small sections and the small sections are arranged for performing editing video, said program comprising the steps of: managing a series of storage areas of the video storage medium in which video data is continuously stored as unit recorded areas; managing a series of available storage areas of the storage medium as unit free areas; storing video data continuously in one or plural unit tree areas of the video storage medium; copying video data of a prescribed amount before and after each gap with the video data stored in scattered unit free areas into the unit free area as gap data when the video data is stored in plural unit free areas; and regenerating the copied gap data as the video data of the prescribed amount before and after the gap when video data stored in plural unit recorded areas is regenerated for regenerating the video data stored in the storage medium in accordance with a playback instruction when the video data stored in plural unit free areas is regenerated, copied gap data is used as video data stored in scattered in unit recorded areas.

BRIEF DESCRIPTION OF THE DRAWINGS

FIG. 7 is a diagram showing editing information for playback of the 2 channel system.

FIG. 11 is a diagram for explaining readout and transfer of video data during regeneration according to the embodiments of the present invention.

FIG. 16 is a diagram showing editing information for playback of 2 channel system.

FIG. 23 is a diagram for explaining readout and transfer of video data during regeneration.

DETAILED DESCRIPTION OF THE PREFERRED EMBODIMENTS

Figure 1:
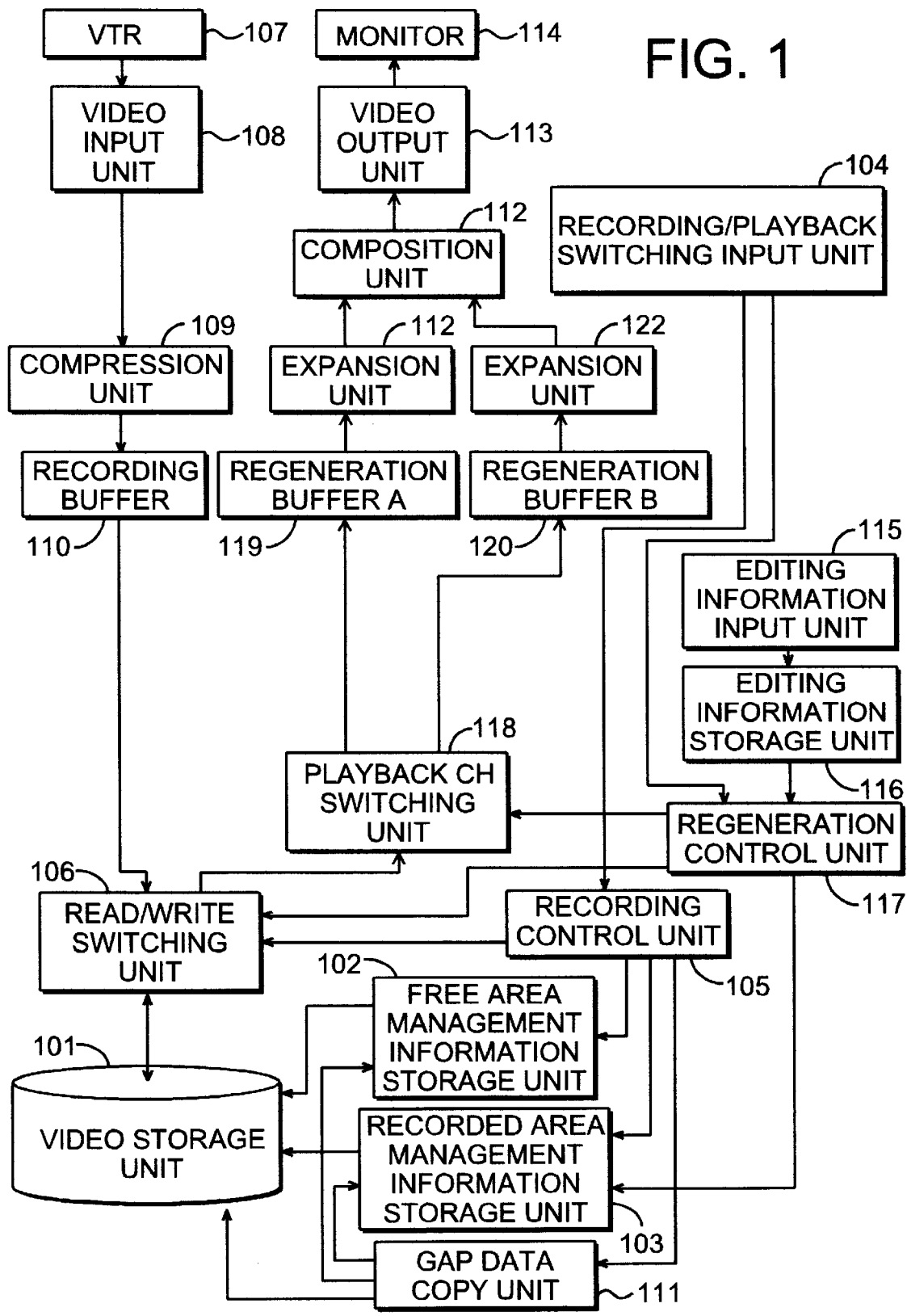
FIG. 1 is a block diagram showing a construction of a non-linear editing apparatus according to embodiments of the present invention.
Figure 12:
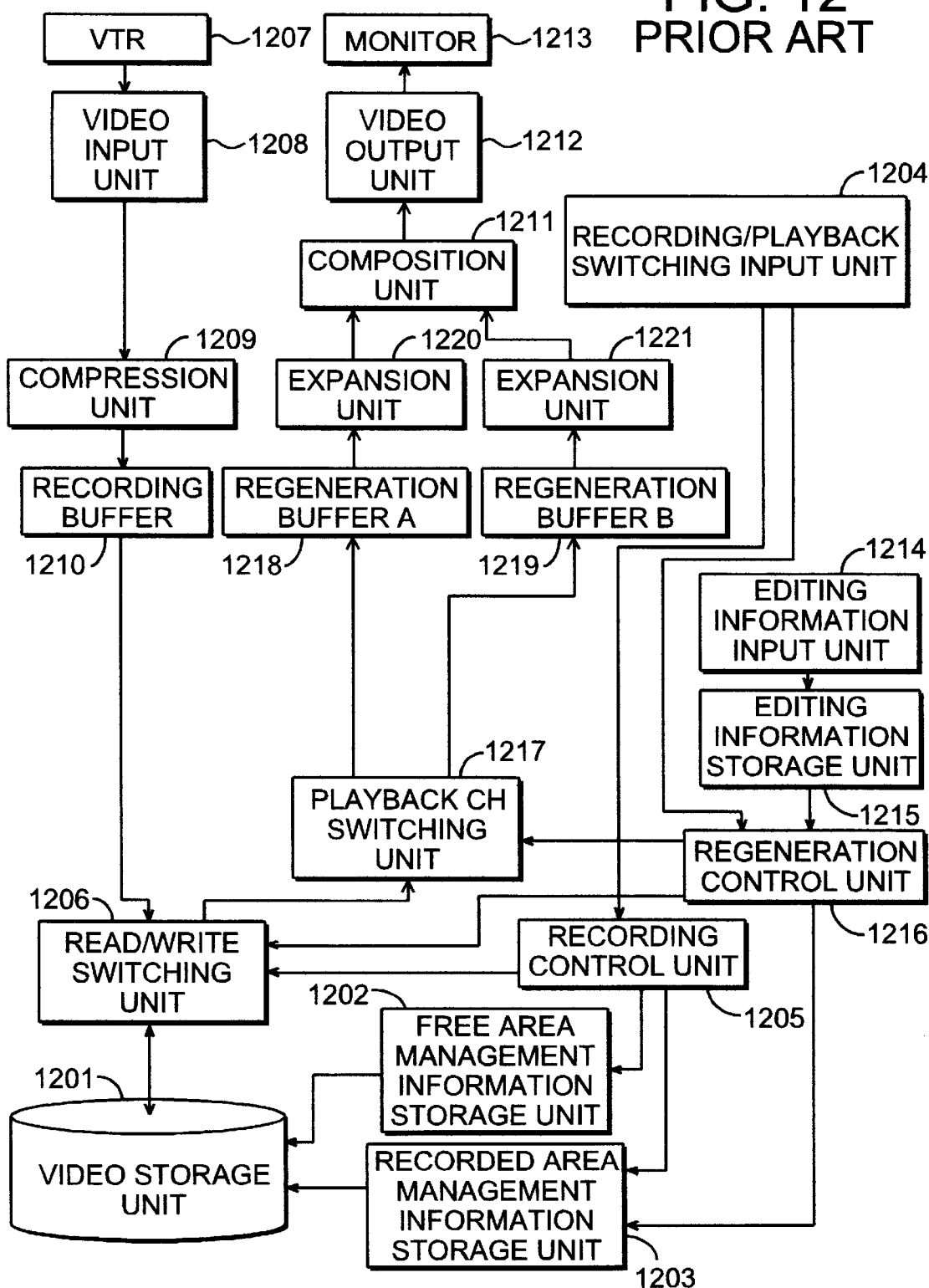
FIG. 12 is a block diagram showing a construction of a prior art non-linear editing apparatus.

FIG. 1 is a block diagram showing u construction of a non-linear video editing apparatus according to a preferred embodiment of the present invention. As shown in the Figure, the non-linear video editing apparatus comprises a video storage unit 101, a free area management information storage unit 102, a recorded area management information storage unit 103, a recording/playback switching input unit 104, a recording control unit 105, a read/write switching unit 106, a VTR 107, a video input unit 108, a compression unit 109, a recording buffer 110, a gap data copy unit 111, a composition unit 122, a video output unit 113, a monitor 114, an editing information input unit 115, an editing information storage unit 116, a regeneration control unit 117, a playback channel (CH) switching unit 118, regeneration buffers A119 and B120, and expansion units 121 and 122. The gap data copy unit 111 is added to the non-linear video editing apparatus according to the prior art in FIG. 12.

In the same Figure, the gap data copy unit 111 is used for storing video data before and after the gap when a series of video data is stored in plural areas of the video storage unit 101. The video storage unit 101, the free area management information storage unit 102, the recorded area management information storage unit 103, the recording/playback switching input unit 104, the recording control unit 105, the read/write switching unit 106, the VTR 107, the video input unit 108, the compression unit 109, the recording buffer 110, the composition unit 112, the video output unit 113, the monitor 114, the editing information input unit 115, the editing information storage unit 116, the regeneration control unit 117, the playback channel (CH) switching unit 118, the regeneration buffers A119 and B120, and the expansion units 121 and 122 are identical to 1201 to 1221 shown in the prior art (FIG. 12) and will not be described. As in the prior art example, assume that the video storage unit 101 comprises a hard disc and video data stored therein is compressed for each frame using a technique such as JPEG and stored during recording, and the compressed video data is 44 Kbytes long per frame. Also assume that random accessibility of the hard disc (the video storage unit 101), a data transfer rate, and a size of a sector (access unit of the hard disc) are 20 msec, 3 Mbytes/sec, and 512 bytes, respectively. The frame time and frame representation of video data amount are identical to those of the prior art. Video data is edited and transferred for each read/write frames as in the prior art, which are 10 frames.

An operation of the non-linear video editing apparatus of the embodiment constructed above will now be described with reference to Figures.

(1) RECORDING

Figure 3:
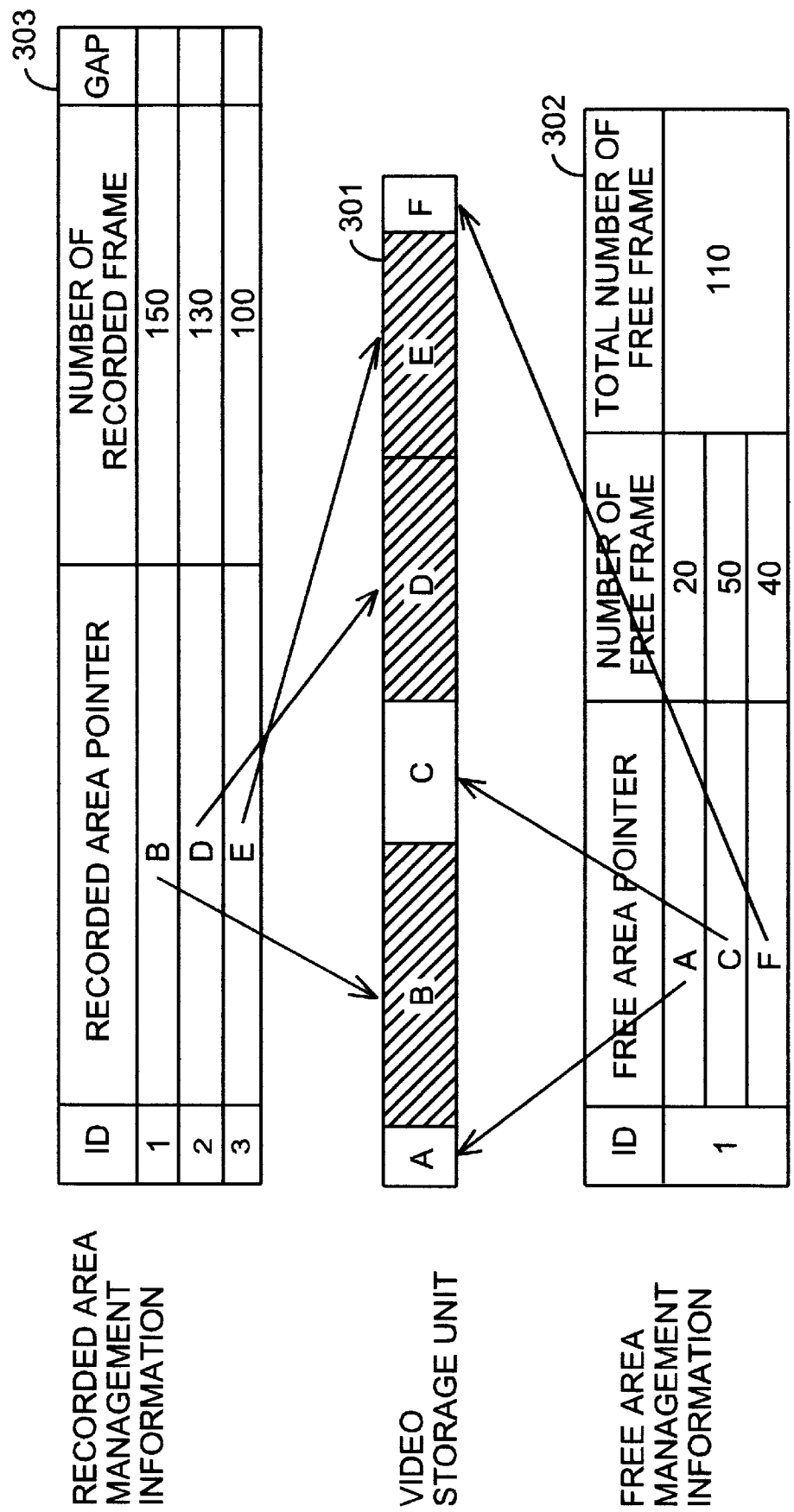
FIG. 3 is a diagram showing an initial storage of the embodiments.
Figure 13:
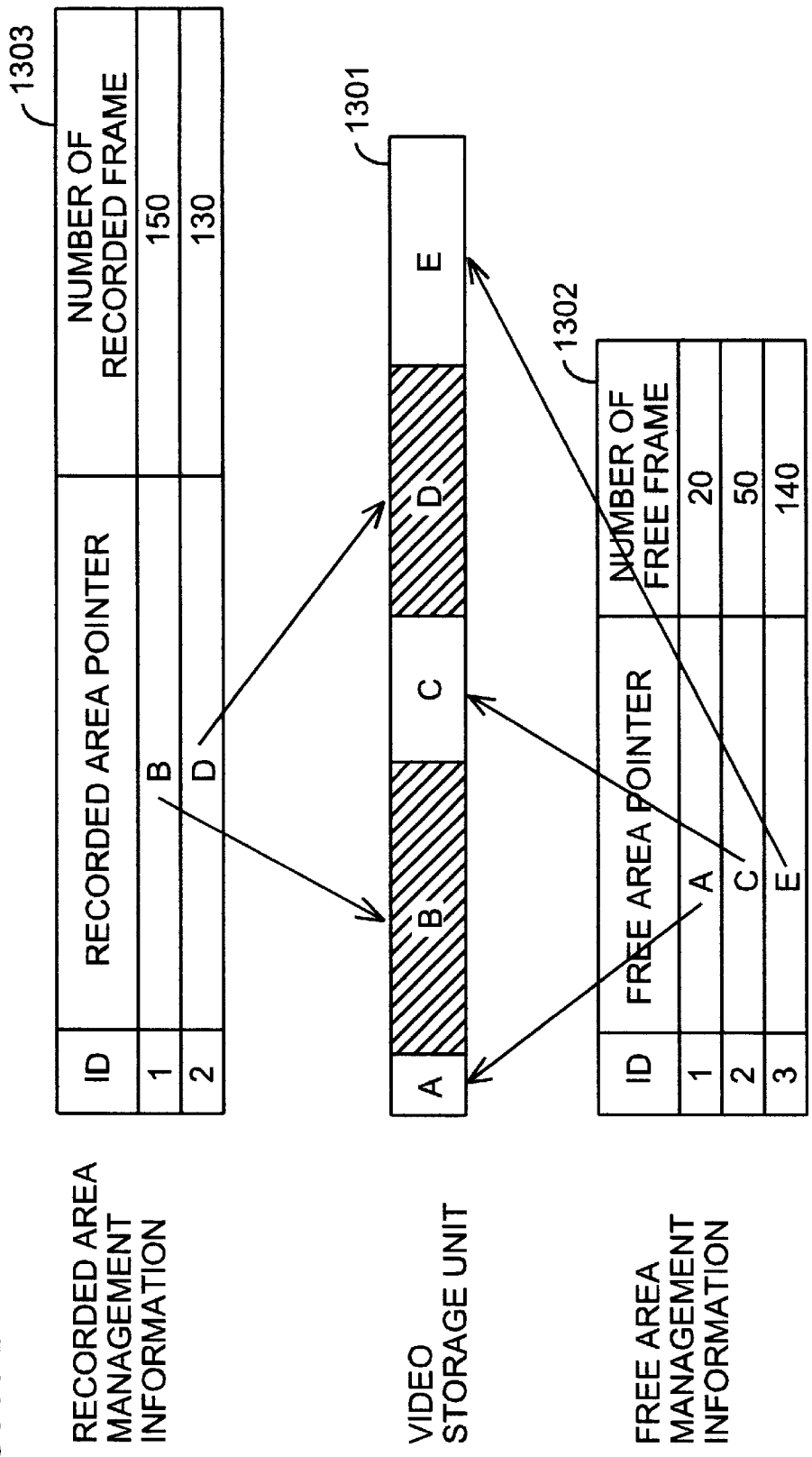
FIG. 13 is a diagram showing an initial storage state according to a prior art.
Figure 14B:
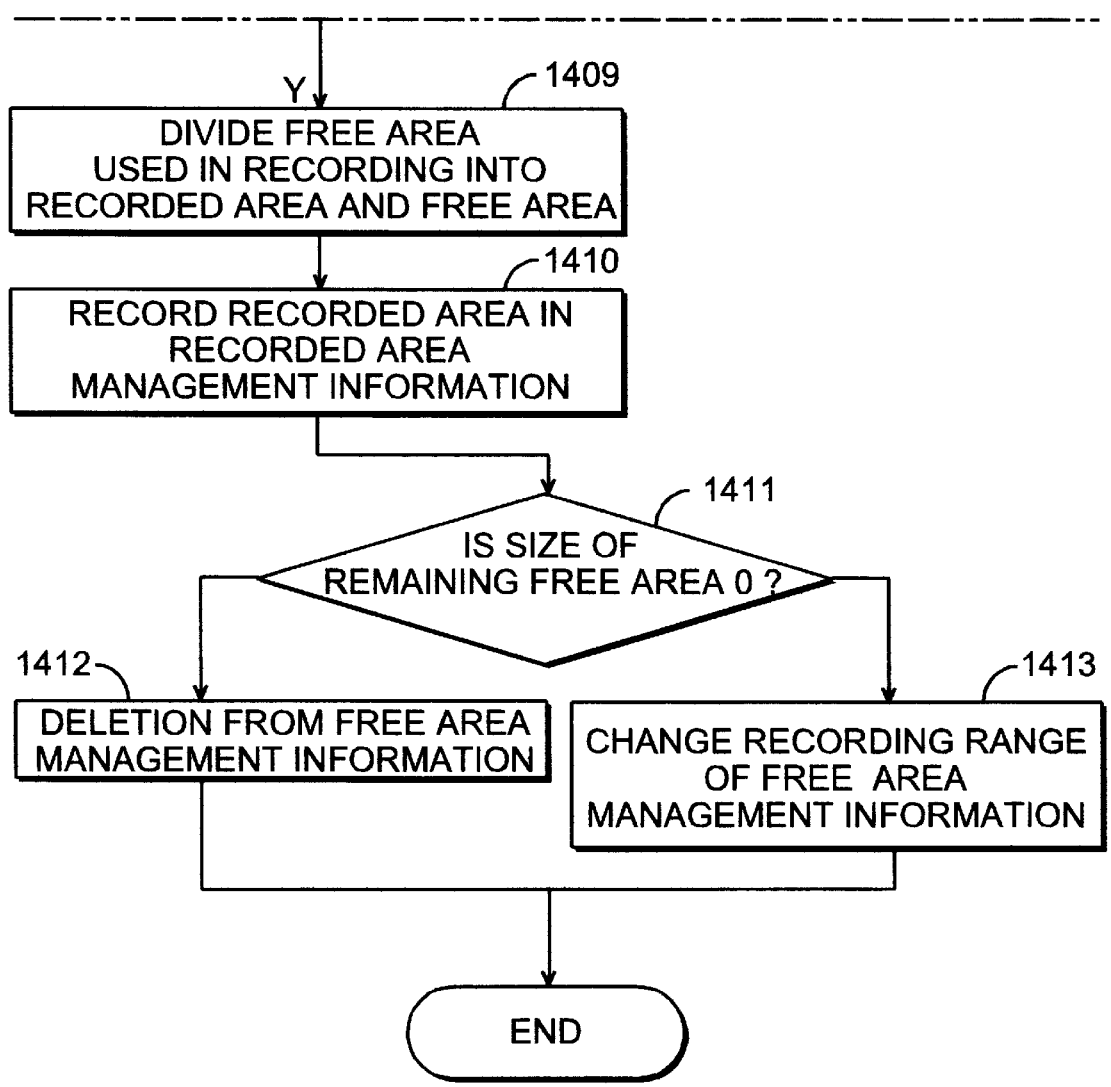
FIG. 14 is a flowchart showing a processing procedure of recording control according to a prior art.
Figure 15:
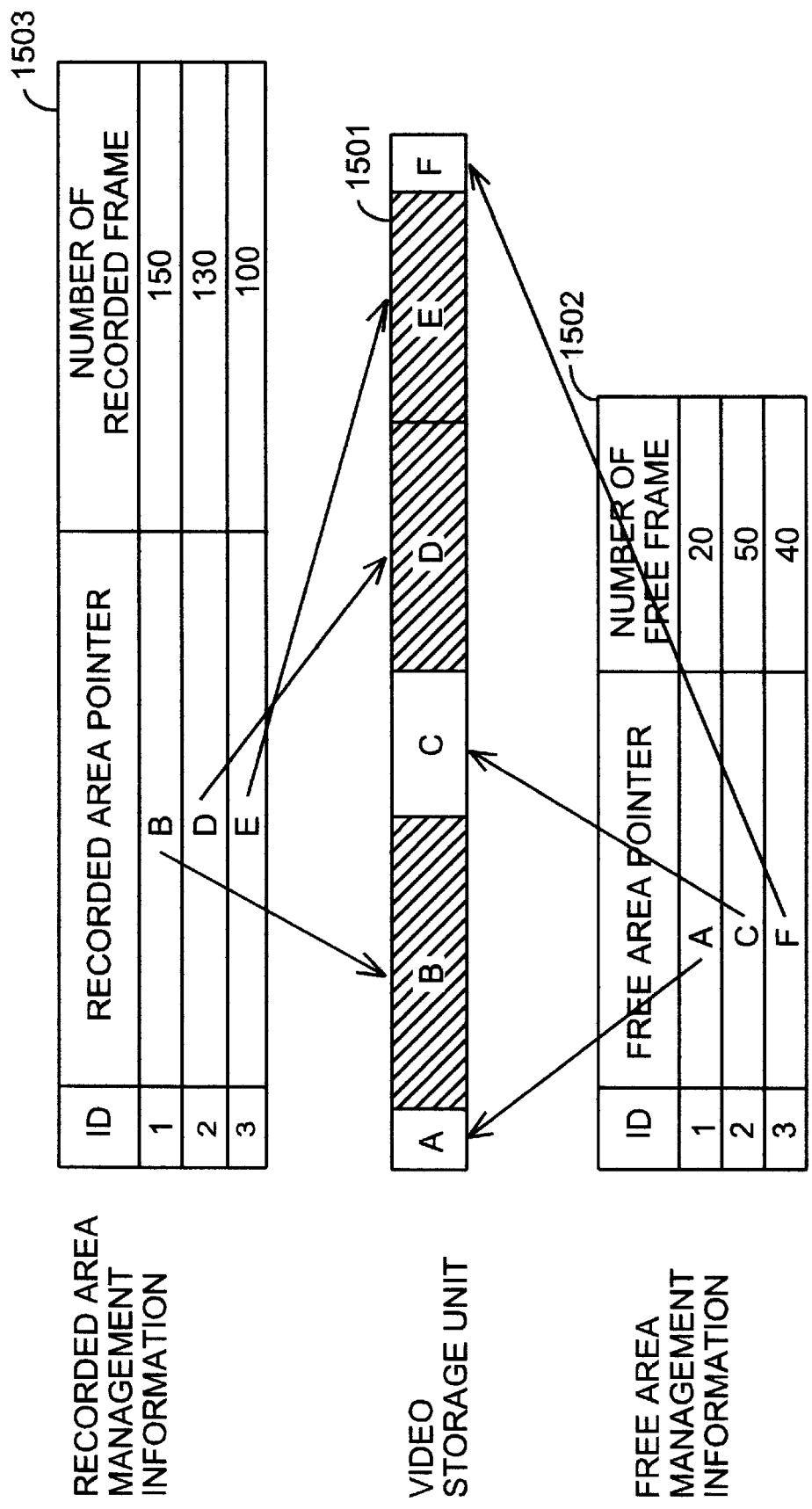
FIG. 15 is a diagram showing a storage state after recording according to a prior art.
Figure 17:
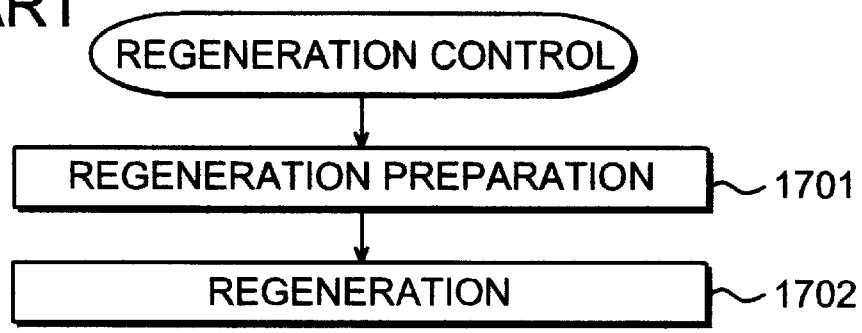
FIG. 17 is a flowchart showing a processing procedure of regeneration control according to a prior art.
Figure 18:
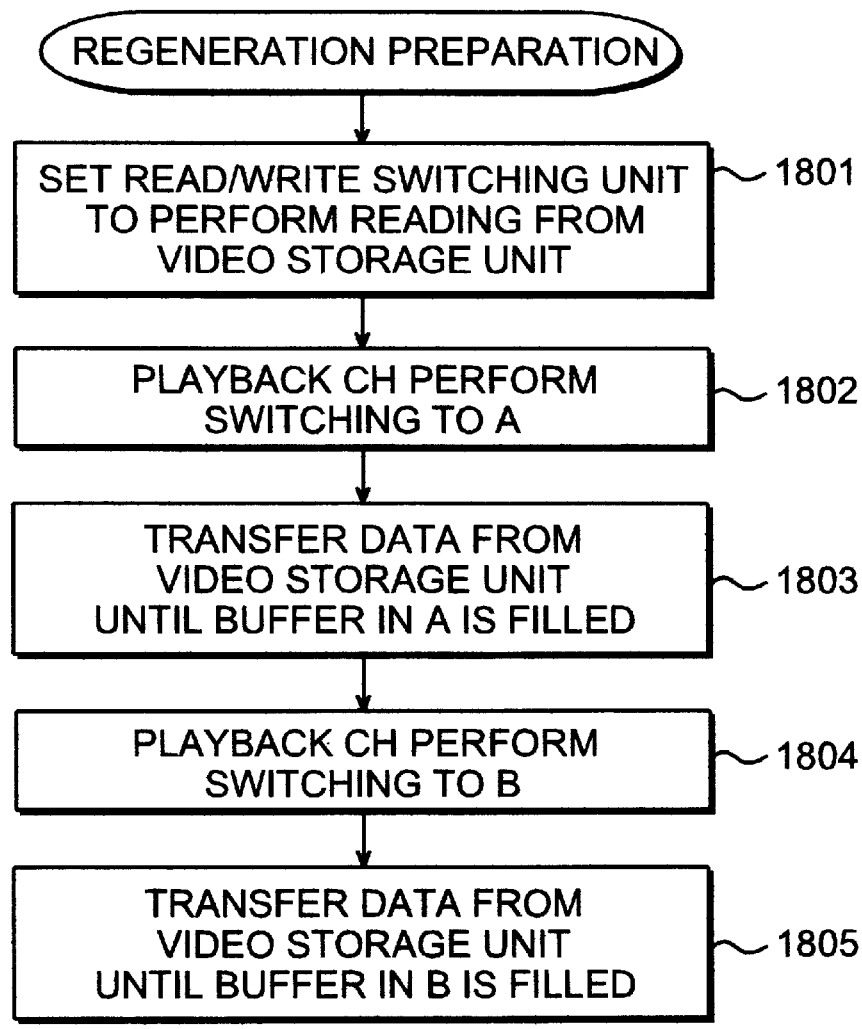
FIG. 18 is a detailed flowchart of regeneration preparation in FIG. 17.
Figure 19:
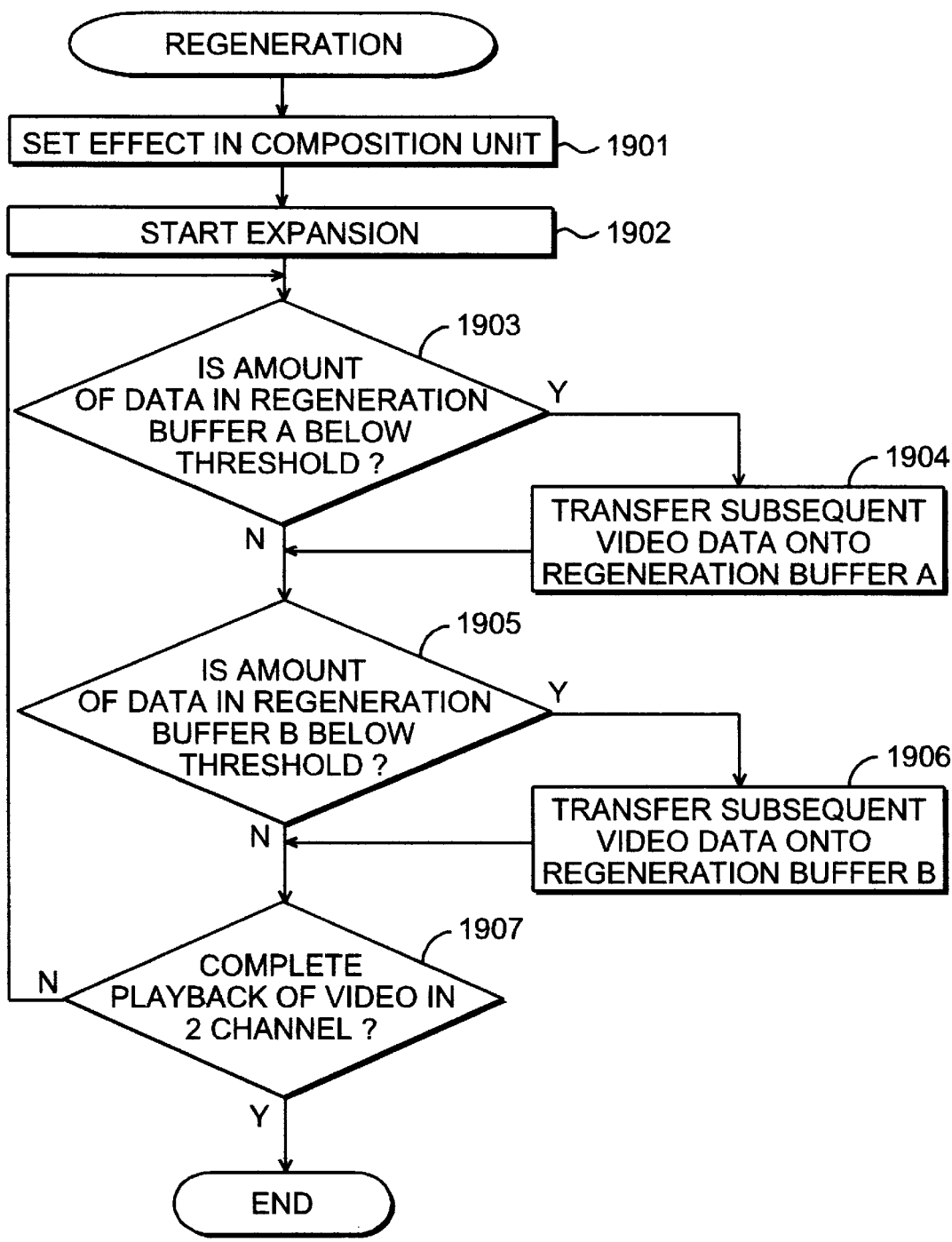
FIG. 19 is a detailed flowchart of regeneration in FIG. 17.
Figure 20:
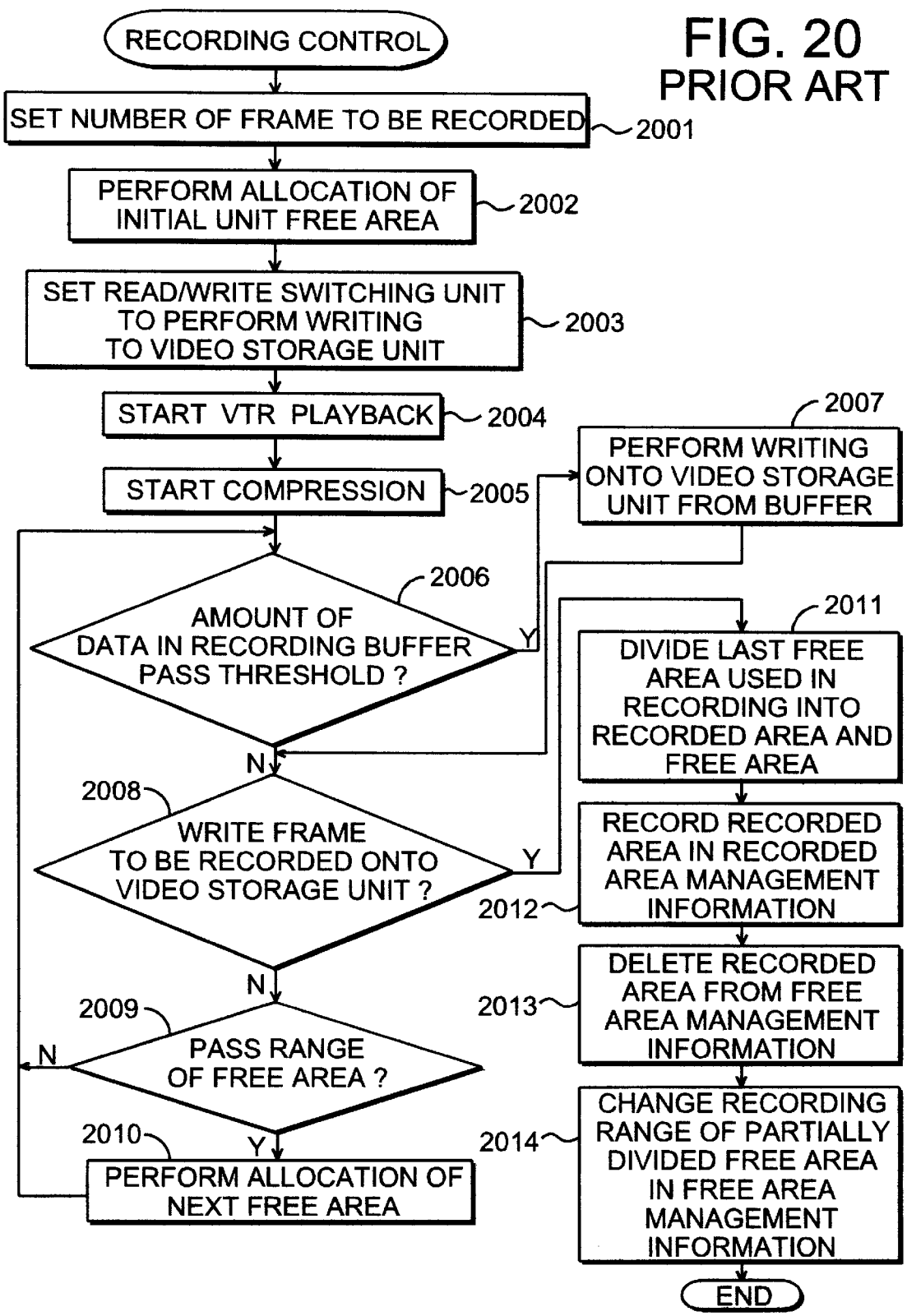
FIG. 20 is a flowchart showing an improved recording processing according to a prior art.
Figure 21:
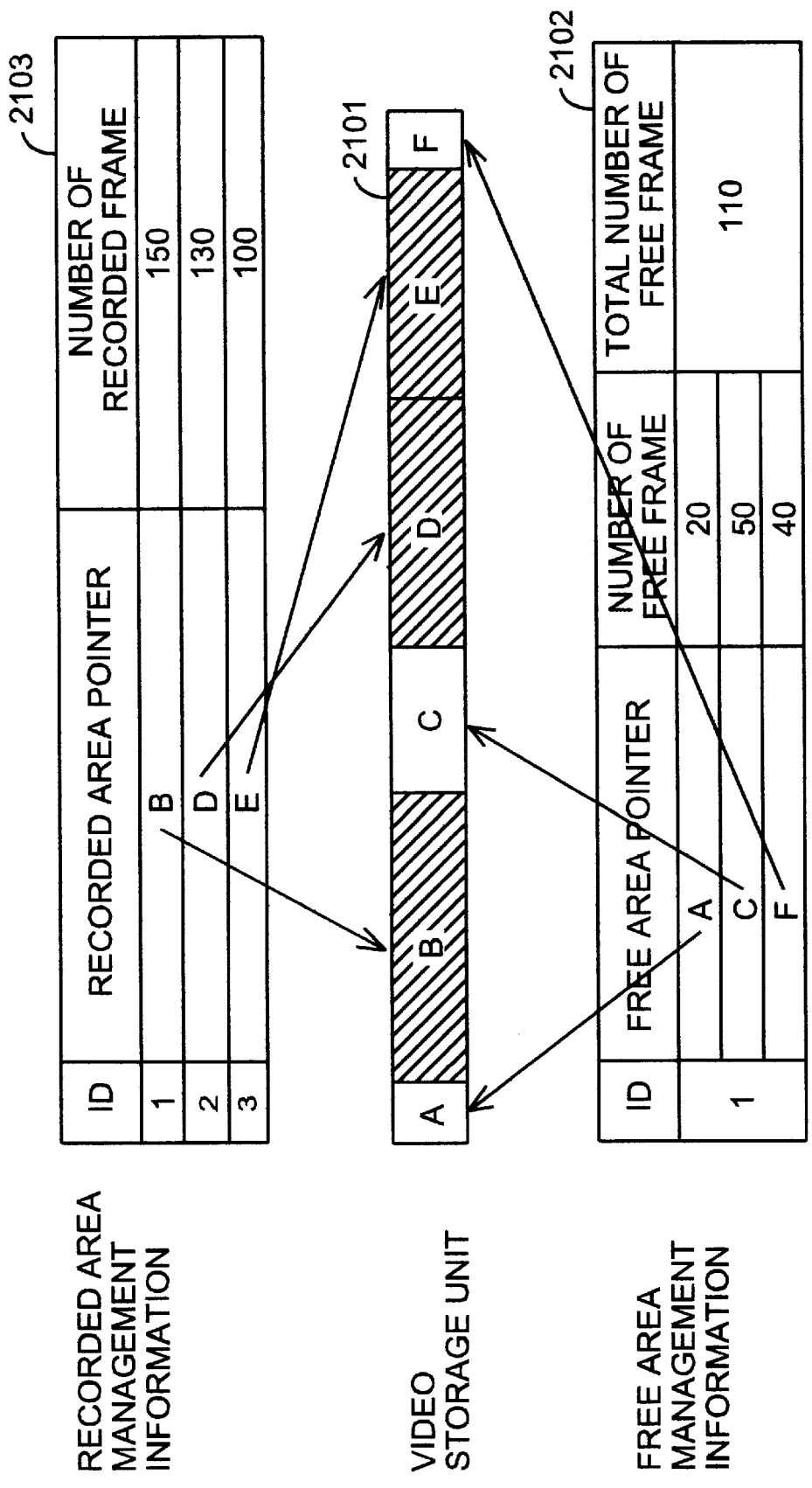
FIG. 21 is a diagram showing a storage state before the improved recording processing according to a prior art.
Figure 22:
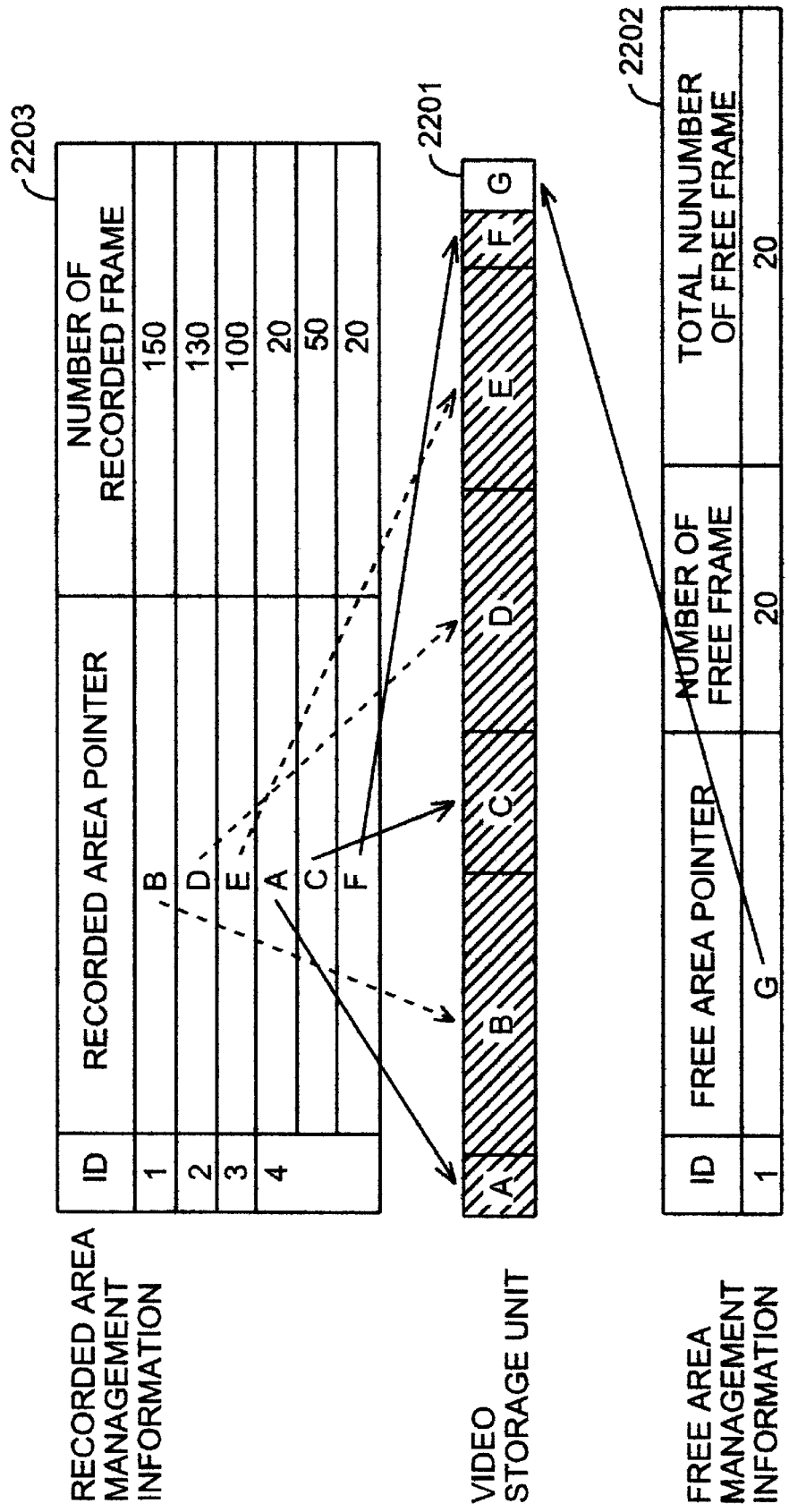
FIG. 22 is a diagram showing a storage state after the improved recording processing according to a prior art.

Assume that video data has been stored in the video storage unit 101. FIG. 3 illustrates storage state of the video storage unit 101 and area management information corresponding thereto. As in FIG. 13 of the prior art, reference numeral 301 1 in the second Figure indicates a storage area of the video storage unit 101 linearly from left and colored portions indicate ranges in which the video data has been stored. Available storage areas of the video storage unit 101 are managed on the basis of free area management information on unit free area indicating a series of available storage areas which is stored in the free area management information storage unit 102. Similarly, storage areas in which video data has been stored are managed on the basis of recorded area management information on unit recorded area indicating a series of storage areas in which a series of video data has been stored, which is stored in the recorded area management information storage unit 103. A, C, and F in the storage area 301 of the video storage unit in the third Figure respectively indicate unit free areas and B, D, and E respectively indicate unit recorded areas.

Reference numerals 302 and 303 illustrate the free area management information and the recorded area management information, respectively. The free area management information 302 includes free area pointer consisting of a start sector and an end sector in a hard disc storage space 301, and the number of free frames of video data which can be recorded, in each free area unit. The unit free areas A, C, and F are handled as one free area by the free area management information storage unit 102 and 20+50+40=110 frames (total number of free frames).

The recorded area management information 303 includes a recorded area ID indicating unique numbers assigned to respective unit recorded areas, a recorded area pointer consisting of information of a start sector and an end sector in the hard disc storage space 301, and the number of recorded frames indicating the number of frames of video data which have been recorded, as information for each unit recorded area. The recorded area management information 303 also includes information on gap data mentioned later. The area pointer is also represented by A, . . . for simplicity.

A video recording in this state is described. When the user provides an instruction for recording using the recording/playback switching input unit 104, the recording control unit 105 starts recording control.

Figure 2:
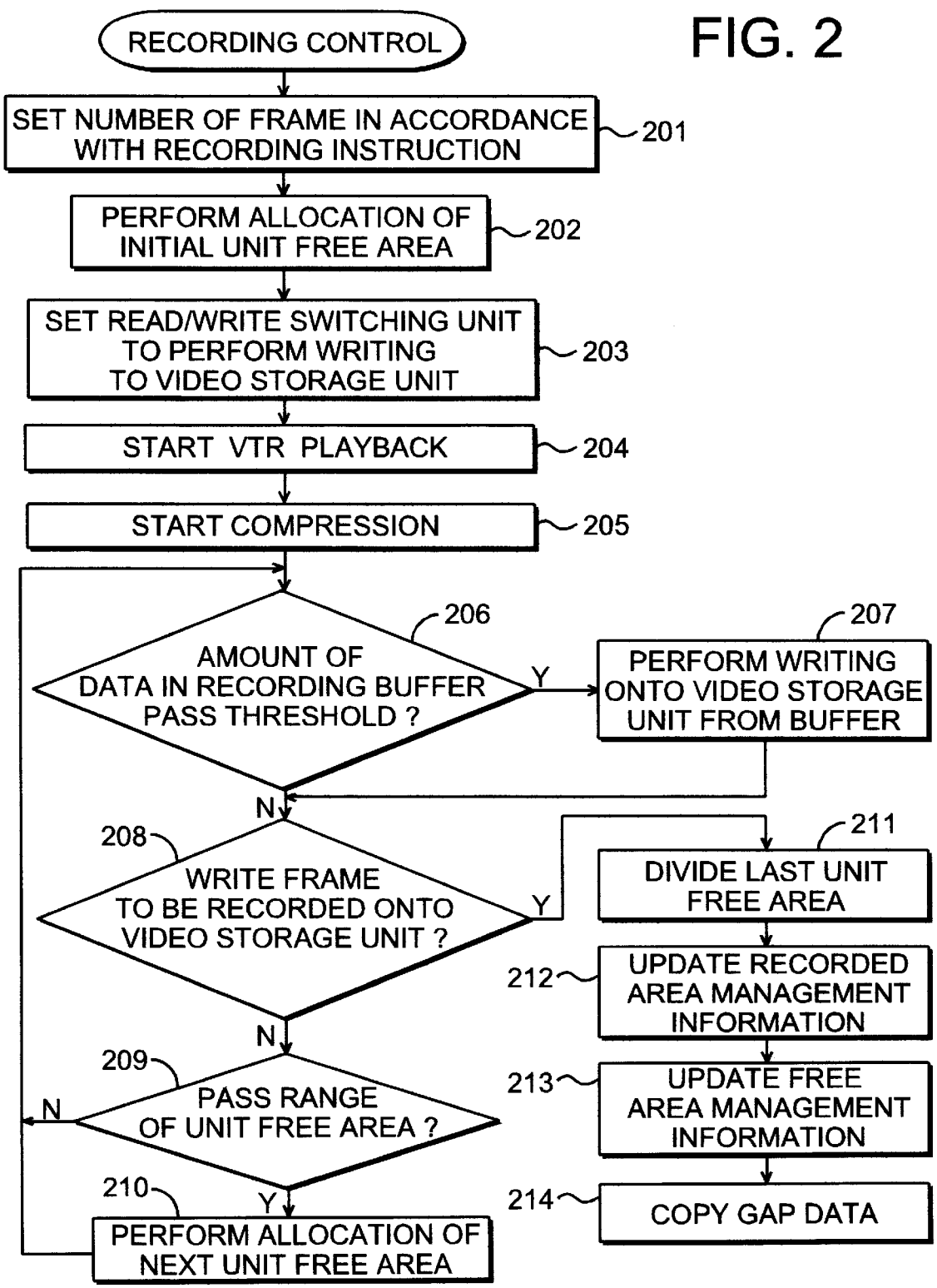
FIG. 2 is a flowchart showing a processing procedure of recording control of the embodiments.

FIG. 2 is a flowchart showing recording under control of the recording control unit 105.

In step 201, length of video to be recorded is set. Assume that the video to be recorded is 90 frames long.

In stop 202, allocation of an initial unit free area in which video data is to be stored is performed by recording. At this time, the late area management information 302 shown in FIG. 3 is referred to, thereby allocation of the unit free area A of 20 frames is performed.

In step 203, the read/write switching unit 106 is set to perform writing onto the video storage unit 101 for recording under control of the recording control unit 105. In step 204, the recording control unit 105 instructs the VTR 107 to start playback and then in step 205 instructs the compression unit 109 to start compression. As a result, video signals output from the VTR 107 are subjected to digital conversion in the video input unit 108, and captured into the non-linear editing apparatus, in which the digital video data is compressed into video data of 44 Kbytes per frame by the compression unit 1209. The compressed video data is temporarily stored in the recording buffer 110.

In step 206, the recording control unit 105 checks whether the number of frames in the recording buffer 110 has exceeded a threshold or not. Assume that the threshold is 10 frames as write frames and writing is performed for each 10 frames starting with the head of the allocated free area.

When it is decided in step 206 that 10 frames are exceeded, in step 207, writing is performed onto the video storage unit 101 from the recording buffer 110. When it decided in step 206 that the threshold are not exceeded, step 208 is performed.

In step 208, the recording control unit 105 checks whether the frames to be recorded of the number set in step 201 have been written onto the video storage unit 101 or not and steps 206 and 207 are repeated until recording is completed, whereby writing onto the video storage unit 101 from the recording buffer 110 is performed.

During this recording, in step 209, it is decided whether the allocated unit free area has been filled with recorded data or not and when it is decided that the area has been filled with the data, in step 210, allocation of next unit free area is performed. As in step 202, the free area management information is referred to by the free area management information storage unit 102 for allocation of the next free area.

When step 210 is performed at the beginning, allocation of the unit free area C is performed and steps subsequent to step 206 are repeated during recording. When it is decided in step 209 that the unit free area C has been filled with recorded data, in step 210, allocation of the unit free area F is performed.

Since the initial unit free area A and the next free area C are 20 frames and 50 frames, respectively, for recording of 90 frames, in steps subsequent to step 210, video data of 20 frames is stored in the unit free area F.

Thus, for storage of the video data of 90 frames, 20 frames, 50 frames, and 20 frames thereof are stored in plural unit tree areas, respectively.

In step 208, when it is decided that writing onto the video storage unit 101 is completed, in step 211, the unit free area F is divided into a unit recorded area and a unit free area. In this case, as shown by 401 in FIG. 4, the unit free area F of 40 frames is divided into the unit recorded area F of 20 frames and the unit free area G of 20 frames.

In step 212, the recorded area management information storage unit 103 assigns uniquely identified numbers to the unit recorded areas and updates recorded area management information so as to retrieve the plural pointers of the unit recorded areas from updated ID, under control of the recording control unit 105.

In step 213, pointers indicating recorded areas of the original unit free areas after recording are deleted from the free area management information and pointers indicating remaining unit free areas (except the unit recorded area of the original unit free area) are updated. As a result, after step 214, the recorded area management information and the free area management information are updated into ones shown by 403 and 402 in FIG. 4, respectively.

Figure 4:
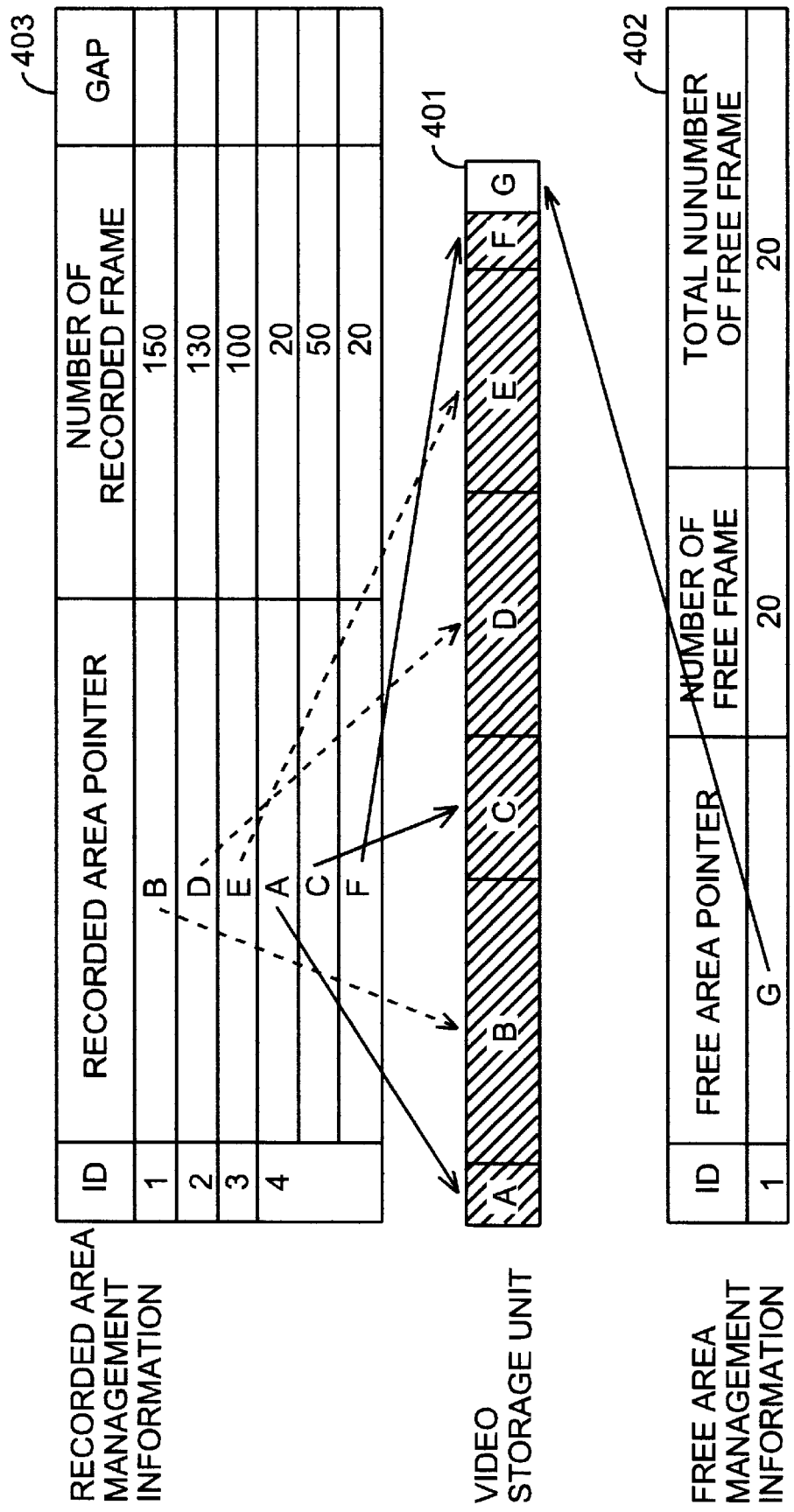
FIG. 4 is a diagram showing a storage state after recording of the embodiments.

In step 214, the recording control unit 105 controls the gap data copy unit 111 so that it copies the gap of plural updated recorded areas into read frames. Assume that ID=4 recorded area is divided into A, C, and F as shown in FIG. 4.

Allocation of 10 frames is performed from the free area G and then last 5 frames of the area A and first 5 frames of the area C are copied into the allocated 10 frames, thereby 10 frames before and after the gap of areas A and C are copied into a continuous area. Similarly, allocation of another 10 frames is performed from the free area G and then last 5 frames of the area C and first 5 frames of the area F are copied into the allocated 10 frames as gap data, thereby 10 frames before and after the gap of areas C and F are copied into a continuous area as gap data. As a result, the video storage unit 101 is changed into one in FIG. 5.

In addition, information indicating that the gap data of the areas A and C is stored in the ID=4 unit recorded area G is written as recorded area management information. Similarly, information indicating that the gap data of the areas C and F is stored in the unit recorded area π is written as the recorded area management information.

As in step 213, the free area management information is updated, with no free areas left. As a result, the free area management information and the recorded area management information become ones shown by 502 and 503 in FIG. 5, respectively.

In this embodiment, since writing is performed for each frames from the recording buffer 110 onto the video storage unit 110, as in the prior art (3) RECORDING 2, decision in atop 206 in FIG. 2 is performed on the basis of "Is the remaining unit free area less than 10 frames ?" and when it is less than 10 frames, allocation of next unit free area is performed. In actuality, the unit free area and the write frames are set to meet specific conditions. Similarly, in updating the free management information in step 213, the unit free area of the write frames or less is handled as zero.

(2) PLAYBACK

A playback of the video recorded in the (1) recording will now be described. Herein, transfer of video data read from the video storage unit to the buffer for playback is described as the operation of the apparatus, allowing for transfer time.

Figure 6:
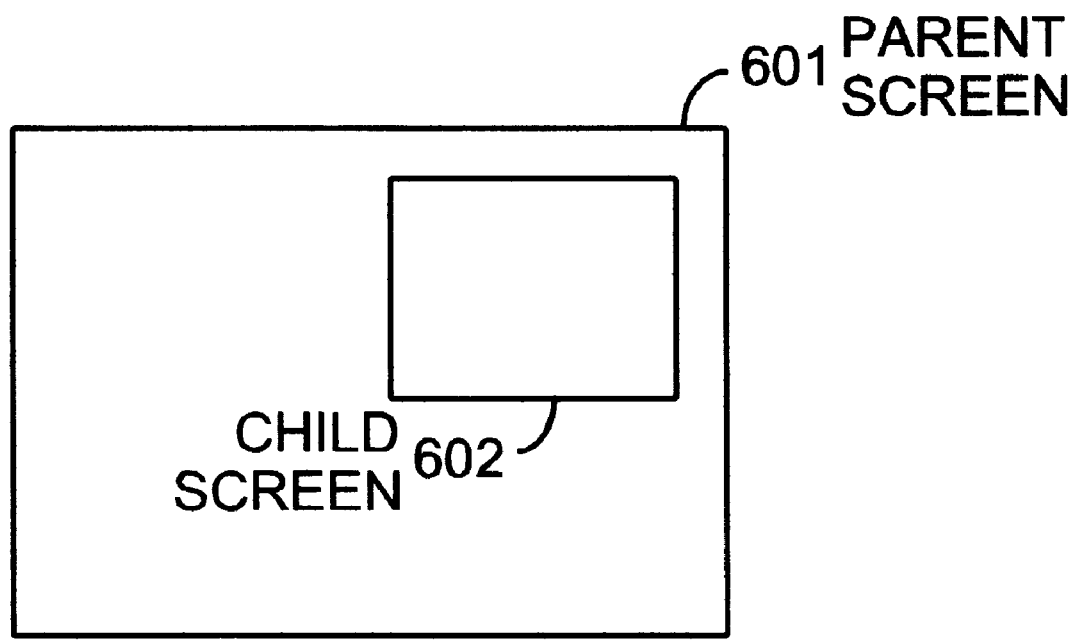
FIG. 6 is a diagram showing a composition effect of 2 channel system playback.

The non-linear video editing apparatus of the embodiment implements effect of "picture-in-picture" described in the prior art as shown in FIG. 6. As in the prior art, the large video and small video are called the parent and child screens in the "picture-in-picture", respectively. This is implemented by performing simultaneous playback (2 channels simultaneous playback) of these video and compositing the same in the composition unit 112.

Assume that channels 1 and 2 are used for the parent and child screens, respectively. In FIG. 1, video data of the parent screen is read from the regeneration buffer A119 of the channel, expanded by the expansion unit 121, and sent to the composition unit 112. Similarly video data of the child screen is read from the regeneration buffer B120 of the channel 2, expanded by the expansion unit 122, and sent to the composition unit 112. Video composited by the composition unit 112 is input through the video output unit 113 to the monitor 114, on which the user see the composite video as shown in FIG. 6.

For such playback, the user preinputs editing information onto the editing information input unit 115. The input editing information is held in the editing information storage unit 116. FIG. 7 shows the editing information. In the Figure, reference numerals 701 and 702 denote editing information of the parent and child screens, respectively. The editing information indicates arrangement of cuts edited for continuous playback. As in the prior art, the editing information is created by specifying cuts in 10 frame unit as read frames.

For example, in the editing information 701 of the parent screen for playback in the order of CUT1 →CUT 2→CUT 3, representing playback time by frames, 1st to 10th frames, 11th to 20th frames, and 21st to 30th frames are CUT 1, CUT 2, and CUT 3, respectively.

Information on the locations of the continuous areas in which respective cuts are stored, or information on what portions thereof the cuts correspond to in the video storage unit which stores the cuts is written as the editing information during recording. For example, the CUT 1 of the parent screen belongs to an ID=1 unit recorded area and indicates video data stored in 51st to 60th frames thereof in the unit recorded area in HD, playback of which is performed to 1st to 10th frames in playback time.

After playback information is recorded by the user, when the recording/playback switching unit 104 issues an instruction for playback, the regeneration control unit 117 starts regeneration control.

Figure 8:
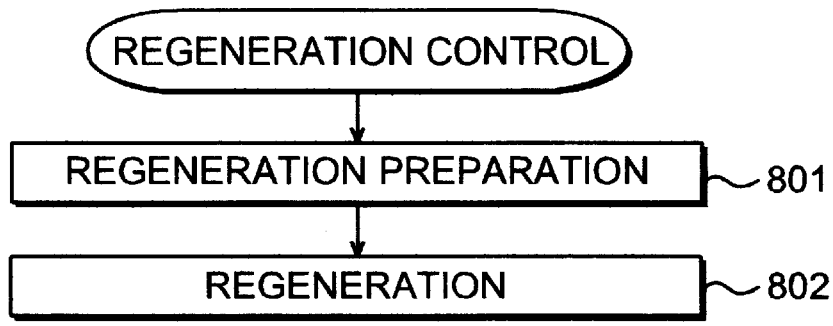
FIG. 8 is a flowchart showing a processing procedure of regeneration control of the non-linear video editing apparatus of the embodiments.

FIG. 8 is a flowchart of a regeneration processing under control of the regeneration control unit 117. The regeneration processing includes regeneration preparation in step 801 in which video data is written onto the regeneration buffer prior to regeneration and regeneration itself in step 802 in which the regeneration buffer is replenished with video data during regeneration.

Figure 9:
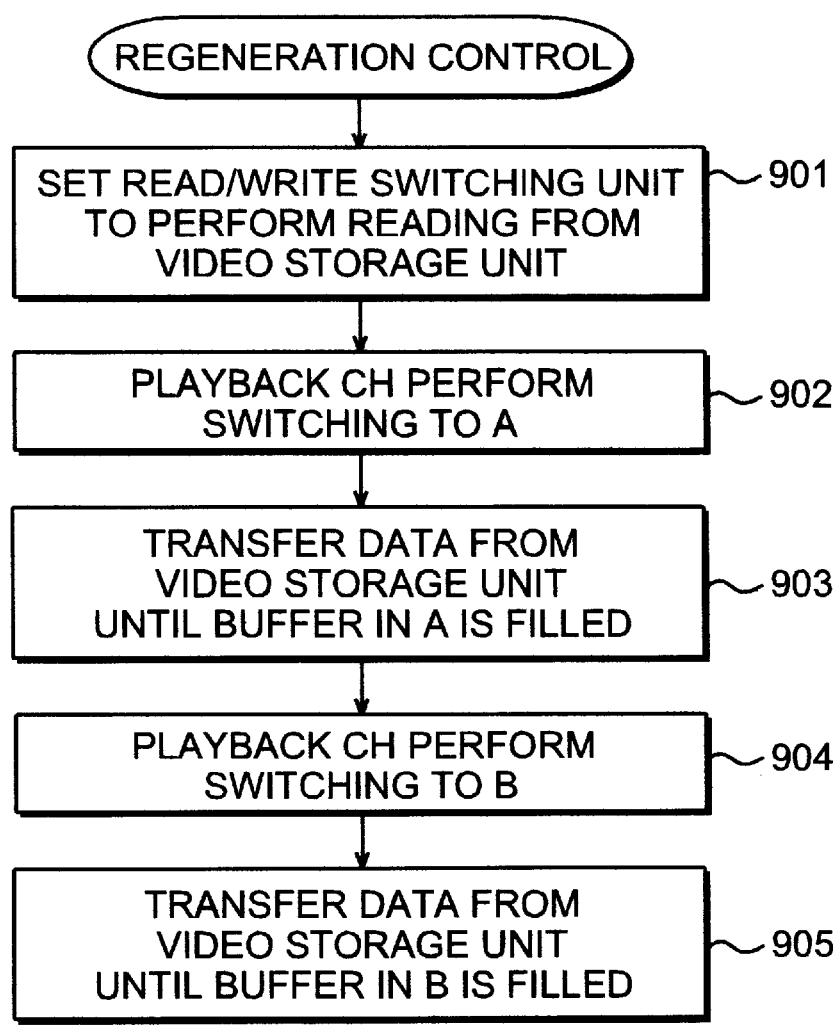
FIG. 9 is a detailed flowchart of regeneration preparation in FIG. 8.

FIG. 9 is a flowchart showing the regeneration preparation in detail. In step 901, the write/read switching unit 106 is set to perform readout from the video storage. unit 101.

In step 902, the playback CH switching unit 118 performs switching to the regeneration buffer A 119 to fill the buffer of the channel 1 with video data. In step 903, data is transferred from the video storage unit 101 until the regeneration buffer A119 is filled with the data. Assume that filling 10 frames or more indicates completion.

Since playback of the video of the parent screen is performed using the regeneration buffer A119, video data of the CUT 1 of 51st to 60th frames in ID=1 area is read from the video storage unit 101 and transferred to the regeneration buffer A119 on the basis of the editing information, whereby filling in the channel 1 is completed.

In step 904, the playback CH switching unit 118 performs switching to the regeneration buffer B119 to fill the buffer of the channel 2 with the data. In step 905, data is transferred from the video storage unit 101 until the regeneration buffer B120 is filled with the data.

Since the regeneration buffer A119 has been used for playback of the video of the parent screen, the regeneration buffer B120 is used for playback of the child screen. Video data of the CUT 1 of 31st to 40th frames in the ID=2 area is read from the video storage unit 101 and transferred to the regeneration butter B120 on the basis of the editing information 702, whereby filling is completed.

Figure 10B:
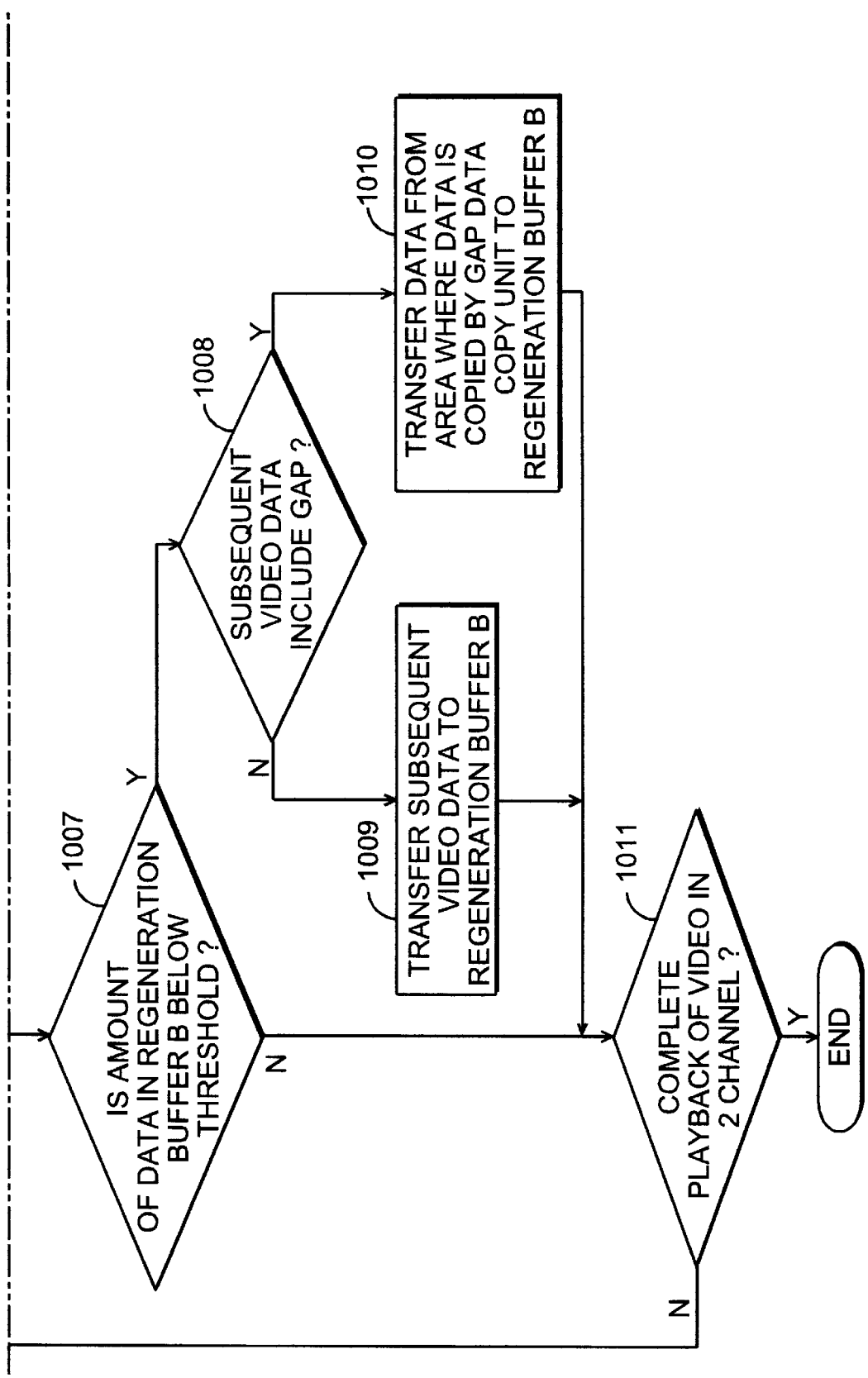
FIG. 10 is a detailed flowchart of regeneration in FIG. 8.

Then, the regeneration in step 802 is performed. FIG. 10 is a flowchart showing the regeneration in detail.

In step 1001, effects are set in the composition unit 112. In this case, setting is performed to implement picture-in-picture shown in FIG. 6. In step 1002, the regeneration control unit 117 instructs each of the expansion unit 121 for the regeneration buffer A119 and the expansion unit 122 for the regeneration buffer B120 to start expansion. In accordance with the instruction, compressed video is input from each regeneration buffer frame by frame to each expansion unit and expanded therein, resulting in original video data, which is input to the composition unit 112, to make composite video data therein, which is through the video output unit 113 and displayed on the monitor 114.

In steps subsequent to step 1002, when expansion starts, data is transferred from the regeneration buffer to the expansion unit for each read frames and consumed therein. Therefore, unless data is transferred from the video storage unit 101 before the regeneration buffer is empty, discontinuity of playback of video occurs. Replenishment of video data in the regeneration buffer ((a)a case with no gap (b)a case with gap) will now be described.

(a) CASE WITH NO GAP

In step 1003, the regeneration control unit 117 checks whether amount of data in the regeneration buffer A119 is below a threshold or not.

When it is decided in step 1003 that the amount is below the threshold, in step 1004, video data to be transferred is checked on the basis of the editing information and it is decided whether the video data includes the gap or not referring to the recorded area management information.

In step 1004, when it is decided that the video data includes no gap, in step 1005, the data is transferred, or otherwise, in step 1006, the gap data copy unit 111 transfers gap data (resulting from copy of video data before and after the gap) under control of the regeneration control unit 117.

Since the threshold is 10 frames, in step 1003 immediately after playback start during regeneration subsequent to the regeneration preparation, when the amount of video data is below the threshold 10 frames, step 1004 is performed. Also in this case, assume that amount of replenishment data is 10 frames as read frames.

Figure 5:
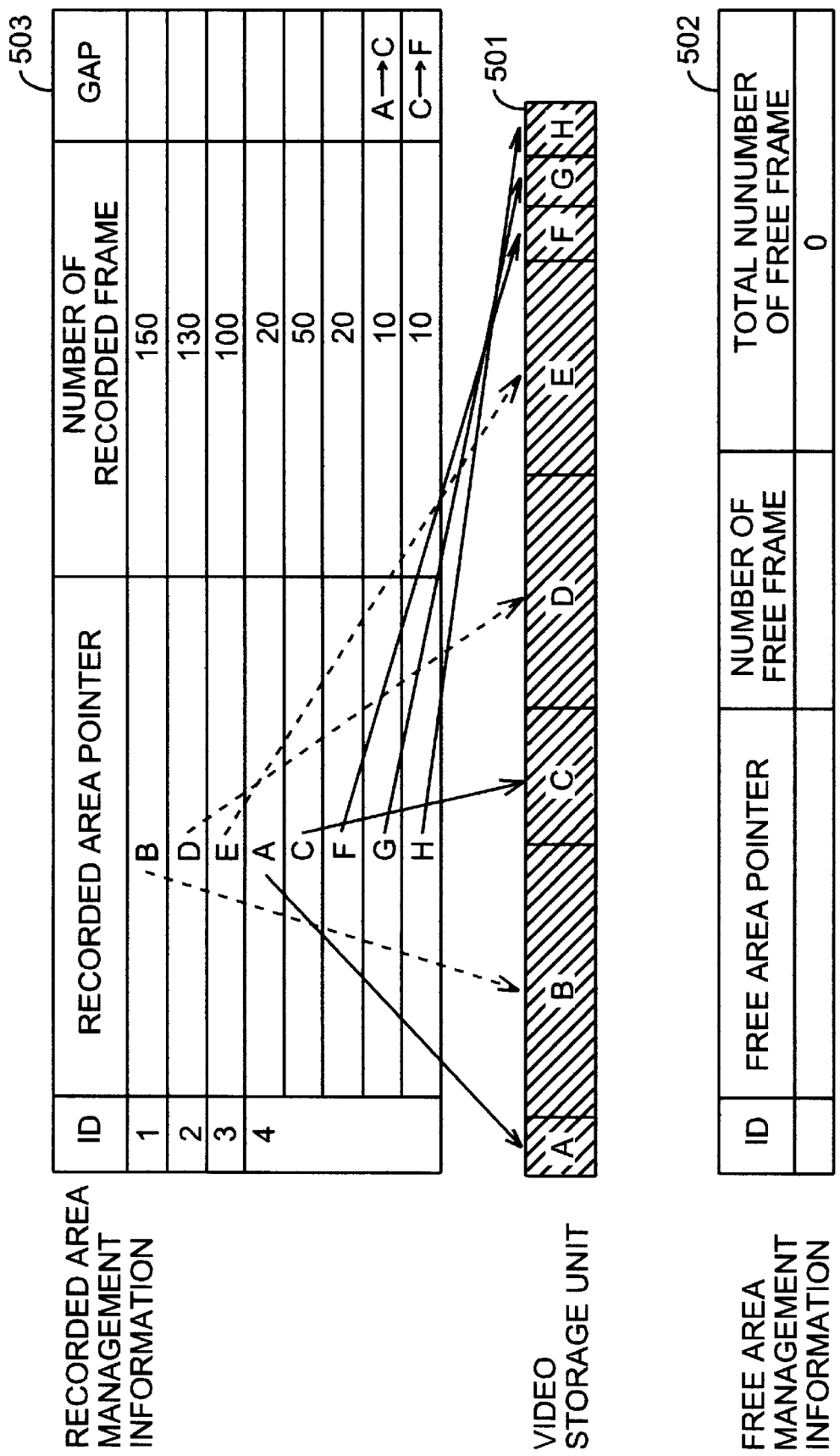
FIG. 5 is a diagram showing a storage state after copying gap data of the embodiments.

Referring now to FIG. 8, CUT 2 of the parent screen to be transferred to the regeneration buffer A in the channel 1 corresponds to 1st to 10th frames in the recorded area ID=1 and it is decided that the video data includes no gap on the basis of the recorded area management information 503 in FIG. 5. As a result,in step 1005, video data is sequentially transferred from the unit recorded area B in FIG. 5.

Since time required for this transfer is 20 msec+44×10/3000 sec=166.7 msec=5 frame time.

The transfer requires 5 frame time. At the completion of transfer, video data of 5 frames in the regeneration buffer A is consumed and 5 frames remains therein, to which video data of 10 frames is added by transfer, video data of 15 frames remaining in the regeneration buffer A119.

After the processing, in step 1007, amount of data in the regeneration buffer R120 is checked and it is decided that the amount is below the threshold or not as in step 1003. In step 1008, it is decided that subsequent data includes gap or not. In case of including no gap, the data is transferred in step 1009, whereas in case of including a gap, copied data is transferred in step 1010.

As in the case of tho regeneration buffer A, setting the threshold to be 10 frames, immediately after playback start, amount of data in the regeneration bugger B120 is below 10 frames. However, since transfer should not be started until processing in steps 1004 to 1006 are completed, after a elapse of 5 frame time from the playback start, processings in steps 1007 to 1009 are performed.

In step 1008, the regeneration control unit 117 decides that the CUT 2 of the parent screen corresponds to 1st to 10th frames of recorded area ID=3 on the basis of the editing information 702 in FIG. 7 and this area includes no gap on the basis of the recorded area management information 503 in FIG. 5. In step 1009, video data of 10 frames is transferred from the area E in FIG. 5.

Since this transfer requires 5 frame time as in the case of transfer to the regeneration buffer A119, transfer to the regeneration buffer B120 after the amount is below the threshold requires 10 frame time (transfer time to the regeneration buffer A+ transfer time to the regeneration buffer B).

Since total transfer time is 10 frame time, when 10th frame of the CUT1 of the child screen is transferred from the regeneration buffer B120 to the expansion unit 122, 10 frames of CUT2 is added thereto, 10 frames remaining in the regeneration buffer B120 at the completion of transfer.

During 5 frame time required for video data transfer to the regeneration buffer B120, since data is consumed in the regeneration buffer A119 at the same space, video data of 5 frames of 15 frames is consumed, 10 frames remaining therein. At the completion of transfer to the regeneration buffer B120, 10 frames remain in each of the regeneration buffers A119 and B120.

Thus, in transfer from a portion including no gap, 10 frames remains in each of the regeneration buffers of the parent and child screens at the completion of consumption and replenishment, indicating the initial filling state. Therefore, thereafter, no discontinuity of data occurs by the repetition. This is identical to the case in which recording is always performed in the continuous area, as described in the (2) playback.

In step 1011 in FIG. 10, it is decided that playback is completed or not and the steps 1003 to 1011 are repeated until playback completes.

(b) CASE WITH GAP

As in the case of transferring data of CUT 2 to the regeneration buffer A immediately after playback of CUT 1 of the parent screen in (a) CASE WITH NO GAP, when playback of CUT 3 of 10 frames starts, CUT 4 must be transferred to the regeneration buffer A119.

In this case, in stop 1004, the regeneration control unit 117 decides that the CUT 4 to be transferred corresponds to video data of 16th to 25th frames stored in ID=4 recorded area on the basis of the editing information in FIG. 7. Also, it decides that video data of 1st to 20th frames, video data of 21st 70th frames, and video data of 71st to 90th frames are stored in the unit recorded area A, the unit recorded area C, and the unit recorded area F in the ID=4 recorded area, respectively, and the CUT 4 includes the gap of the areas A and C, on the basis of the recorded area management information 503 in FIG. 5.

In step 1004, when it is decided that there is gap, in stop 1006, it is decided that for a portion before and after the gap of A→C, gap data is copied into the area G on the basis of the recorded area management information 503 and therefore video data of this 10 frames is transferred. That is, as shown in FIG. 11, as video data of the CUT 4, J and K are replaced by L, thereby a series of video data is transferred once rather than twice. In (1) recording, since video data of read frames is copied as the gap data, in (2) playback, readout of the gap data allows transfer of read frames at a time.

In steps subsequent to step 1007, in playback of CUT 4 of the child screen, video data of last 5 frames in area C and first 5 frames in area F of the storage area 501 in FIG. 5 are replaced by video data of 10 frames in area H into which gap data have been copied. Also in this case, as shown in FIG. 11, M and N are not respectively transferred and 0 is transferred once.

This gap data transfer also requires 5 frame time as in the (a) case with no gap, since a series of 10 frames are transferred. That is, since transfer of a cut including a gap requires the same time as in transfer of a cut including no gap, video data is not reduced in each of the regeneration buffers. As a result, playback with no discontinuity is possible.

Steps 1003 to 1010 are repeated until regeneration of data is completed in step 1011, thereby playback is performed with no discontinuity according to editing information set by the user.

In (b), for convenience, a case in which one cut includes one gap data has been described. Alternatively, video including one gap or more is handled in the same way as follows. In the apparatus of the embodiment, video data is transferred from the video storage unit to the regeneration buffer for each 10 frames. As shown in FIG. 11, when editing is performed in a way that latter part of video data in area C and video data in area F are specified as one cut, decision in step 1004 or 1008 in FIG. 10 is performed for each read frames starting with the head of the cut, whereby when it is decided that P or Q in FIG. 11 includes no gap, in step 1005 or 1009 video data is transferred from P or Q.

When the read frames cannot be read at a time, that is, when it is decided in step 1004 or 1008 that video data includes no gap, in step 1006, gap data of T is transferred rather than data of R and S, whereby playback with no discontinuity is possible.

As should be appreciated from the foregoing description, in accordance with the non-linear video editing apparatus of this embodiment, when discontinuous free areas are scattered on a hard disc, on assumption that a series of free areas are a unit free area, the recording control unit. 105 performs recording in plural unit free areas and then the gap data copy unit 111 copies a portion including a gap into another area. Therefore, it is possible to record video data in areas which approximates total free areas even if individual unit free area is small. In playback, data is read and transferred from the area where data has been copied in readout and transfer of a portion before and after a gap under control of the regeneration control unit 117, thereby 2 channel simultaneous playback is realized with no discontinuity. In accordance with the invention, video data can be recorded for a long time if free areas are scattered. As a result, storage media is utilized effectively and 2 channel playback with no discontinuity is guaranteed.

In this embodiment, handling of only video has been described. Alternatively, only audio, and video and audio may be handled in the same way.

It should be noted that each number in this embodiment is illustrative and the threshold or the like can be changed into appropriate one to meet specific conditions.

Furthermore, the non-linear video editing apparatus of this embodiment is implemented by using a storage medium which stores the editing program for performing the video editing and by executing the program in a computer system with a hard disc.

What is claimed is:

1. A method of editing video in which video stored in a random access storage medium is divided into small sections and the small sections are arranged for performing editing video, said method comprising the steps of:

managing a series of storage areas of the storage medium in which video data is continuously stored as unit recorded areas;

managing a series of available storage areas of the storage medium as unit free areas;

storing video data continuously in one or plural unit free areas of the storage medium;

copying video data of a prescribed amount before and after each gap with the video data stored in scattered unit free areas into the unit free area as gap data when the video data is stored in plural unit free areas; and regenerating the copied gap data as the video data of the prescribed amount before and after the gap when video data stored in plural unit recorded areas is regenerated for regenerating the video data stored in the storage medium in accordance with a playback instruction.

2. A non-linear video editing apparatus which divides video stored in a random access storage medium into small sections and arranges the small sections to perform editing video, said apparatus comprising:

a video storage unit with random access storage areas for storing video data;

a recorded area management information storage unit for storing recorded area management information including information of a location and a capacity of each unit recorded area, and information of video data stored in the unit recorded area, on assumption that a series of storage areas of the video storage unit in which video data is continuously stored are unit recorded areas;

a free area management information storage unit for storing free area management information including information of a location and a capacity of each unit free area on assumption that a series of available storage areas of the video storage unit are unit free areas;

a recording control unit for storing video data in one or plural unit free areas of the video storage unit;

a gap data copy unit for copying video data of a prescribed amount before and after each gap with the video data stored in scattered unit free areas into the unit free area as gap data, after recording under control of the recording control unit, when the video data is stored in plural unit free areas; and a regeneration control unit for regenerating the gap data as video data of a prescribed amount before and after the gap, when video data stored in plural unit recorded areas is regenerated for regenerating video data stored in the video storage unit in accordance with a playback instruction.

3. The non-linear editing apparatus of claim 2 wherein the video data storage unit comprises a magnetic hard disc.

4. A video editing program storage medium which stores a video editing program in which video stored in a random access video storage medium is divided into small sections and the small sections are arranged for performing editing video, said program comprising the steps of:

managing a series of storage areas of the video storage medium in which video data is continuously stored as unit recorded areas;

managing a series of available storage areas of the video storage medium as unit free areas;

storing video data continuously in one or plural unit free areas of the video storage medium;

copying video data of a prescribed amount before and after each gap with the video data stored in scattered unit free areas into the unit free area as gap data when the video data is stored in plural unit free areas; and regenerating the copied gap data as the video data of the prescribed amount before and after the gap when video data stored in plural unit recorded areas is regenerated for regenerating the video data stored in the video storage medium in accordance with a playback instruction.

* * * * *